US012501116B2

(12) United States Patent
Lee et al.

(10) Patent No.: US 12,501,116 B2
(45) Date of Patent: Dec. 16, 2025

(54) MEDIA ITEM AND PRODUCT PAIRING

(71) Applicant: Google LLC, Mountain View, CA (US)

(72) Inventors: Jeewoong Eric Lee, Long Island City, NY (US); Lukas Georg Eiermann, San Francisco, CA (US); Raymond Manuel Vazquez, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 256 days.

(21) Appl. No.: 17/878,831

(22) Filed: Aug. 1, 2022

(65) Prior Publication Data
US 2024/0040201 A1 Feb. 1, 2024

(51) Int. Cl.
H04N 21/478 (2011.01)
G06F 3/0482 (2013.01)
H04N 21/45 (2011.01)

(52) U.S. Cl.
CPC ..... H04N 21/47815 (2013.01); G06F 3/0482 (2013.01); H04N 21/4532 (2013.01)

(58) Field of Classification Search
CPC ............ H04N 21/4532; H04N 21/4781; G06F 3/0482
See application file for complete search history.

(56) References Cited

U.S. PATENT DOCUMENTS

| 9,177,225 | B1* | 11/2015 | Cordova-Diba .......... G06T 7/12 |
| 10,318,543 | B1 | 6/2019 | Sharifi |
| 10,378,543 | B2 | 8/2019 | Buchholz et al. |
| 10,620,801 | B1 | 4/2020 | Fein et al. |
| 2007/0255755 | A1 | 11/2007 | Zhang et al. |
| 2011/0004517 | A1 | 1/2011 | Soto et al. |
| 2012/0109976 | A1 | 5/2012 | Beaudet |
| 2018/0152764 | A1 | 5/2018 | Taylor et al. |

(Continued)

FOREIGN PATENT DOCUMENTS

| CN | 112367549 A | 2/2021 |
| TW | 200507648 A | 2/2005 |

(Continued)

OTHER PUBLICATIONS

International Search Report and Written Opinion for International Application No. PCT/US2023/029137, mailed Oct. 12, 2023, 11 Pages.

(Continued)

Primary Examiner — Junior O Mendoza
(74) Attorney, Agent, or Firm — Lowenstein Sandler LLP

(57) ABSTRACT

A method includes presenting a user interface (UI) including one or more graphical representations of one or more videos. Each graphical representation of a respective video is selectable to initiate playback of the respective video. A graphical representation is displayed with a UI element in a collapsed state. The UI element includes information identifying a plurality of products covered by the respective video. The method further includes modifying a presentation of the UI element from the collapsed state to an expanded state. The UI element in the expanded state includes a number of visual components, each associated with one of the plurality of products. The method further includes initiating presentation of the video upon user selection of one of the plurality of visual components.

21 Claims, 11 Drawing Sheets

(56) References Cited

U.S. PATENT DOCUMENTS

| | | | | |
|---|---|---|---|---|
| 2020/0134320 A1* | 4/2020 | Crossley | ................ | G06V 20/46 |
| 2021/0319407 A1 | 10/2021 | Cunliffe et al. | | |
| 2022/0222470 A1 | 7/2022 | Hropak et al. | | |
| 2022/0253136 A1* | 8/2022 | Holder | .................... | G06F 3/017 |
| 2023/0334865 A1* | 10/2023 | Ravuru | ................ | G06V 20/41 |

FOREIGN PATENT DOCUMENTS

| | | |
|---|---|---|
| TW | 200928948 A | 7/2009 |
| TW | I633510 B | 8/2018 |
| TW | I770883 B | 7/2022 |
| WO | 2018094201 A1 | 5/2018 |

OTHER PUBLICATIONS

International Search Report and Written Opinion for International Application No. PCT/US2023/029139, mailed Oct. 12, 2023, 11 Pages.

Written Opinion for International Application No. PCT/US2023/029139, mailed Jun. 13, 2024, 06 Pages.

Office Action for Taiwan Patent Application No. 112128856, mailed Apr. 18, 2024, 15 Pages.

\* cited by examiner

MEDIA ITEM AND PRODUCT PAIRING

TECHNICAL FIELD

Aspects and implementations of the present disclosure relate to methods and systems for facilitating pairing of media items and associated objects, and more specifically to systems for facilitating pairing of media items and products.

BACKGROUND

A platform (e.g., a content sharing platform) can transmit (e.g., stream) media items to client devices connected to the platform via a network. Different types of client devices may be optimized for different tasks, preferred by a user for different tasks, or the like. Media items may contain references to one or more products.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Systems and methods are disclosed for facilitating user participation in one or more engagement activities associated with one or more products of a media item. In some implementations, a method includes presenting a user interface (UI) including one or more graphical representations of one or more videos. Each graphical representation of a respective video is selectable to initiate playback of the respective video and is displayed with a UI element in a collapsed state. The UI element in the collapsed state includes information identifying a plurality of products covered by the respective video. The method further includes continuing to present a graphical representation of the respective video while modifying a presentation of the UI element from the collapsed state to an expanded state. The modification of the presentation of the UI element is performed responsive to a user interaction with the UI element in the collapsed state. The UI element in the expanded state includes a plurality of visual components, each associated with one of the plurality of products. The method further includes initiating playback of a video covering a product associated with a selected visual component, responsive to a user selection of a respective one of the plurality of visual components of the UI element in the expanded state.

In some embodiments, presentation of the UI element may be modified to a product focused state. The product focused state may include detailed information about one or more products associated with a content item. The presentation of the UI element may be modified to a product focused state responsive to user selection of a UI element or UI element component. The presentation of the UI element may be modified to a product focused state responsive to user selection of one of a plurality of visual components of the UI element in an expanded state.

In some embodiments, presentation of the UI element and the graphical representations may be performed responsive to a user device requesting a home feed of content items for display. Presentation of the UI element and the graphical representations may be performed responsive to the user device's search query. Presentation of the UI element and the graphical representations may be performed responsive to a user request to view a content item.

The UI element in the expanded state may include one or more tabs. A first tab may be associated with a plurality of products. A second tab may be associated with a plurality of portions (e.g., chapters) of the respective content item. The first tab may be presented by default.

In some embodiments, presentation of the UI element may be modified to a transaction state. Modification to a transaction state may be performed responsive to a user selection of a UI element or component of a UI element. The UI element in the transaction state may facilitate a transaction associated with one of the plurality of products.

One or more UI elements may be overlaid. A UI element may be overlaid on a content item being presented. A UI element may be overlaid on a graphical representation of a content item. User interaction with a UI element may include dwelling on the UI element.

In another aspect, a method includes providing, to a device, for display by a UI of the device, one or more graphical representations of one or more content items. Each graphical representation of a respective content item is selectable to initiate presentation of the respective content item. The method further includes providing to the device instructions to display a UI element in a collapsed state with a first graphical representation of a first content item. The UI element may include information identifying a plurality of products covered by the first content item. The method further includes providing instructions to the device to modify a presentation of the UI element. The instructions may be provided responsive to receiving an indication of a user interaction with the UI element. The instructions may facilitate transitioning the UI element from a collapsed state to an expanded state. The UI element in the expanded state includes a plurality of visual components. Each of the visual components is associated with one of the plurality of products. The method further includes providing instructions to the device facilitating presentation of the content item. The instructions facilitating presentation of the content item may be provided responsive to receiving an indication of a user selection of one of the plurality of visual components of the UI element in the expanded state.

In some embodiments, the method includes providing instructions to the device facilitating modification of the presentation of the UI element from the expanded state to a product focused state. The modification of the UI element may be performed responsive to receiving an indication of a user selection of the one of the plurality of visual components of the UI element in the expanded state. The UI element in the product focused state may include detailed information about the product associated with the selected visual component.

In some embodiments, the method includes obtaining identifiers of the plurality of products covered by the first content item as output from a trained machine learning model. The trained machine learning model receives, as input, data associated with the first content item.

In some embodiments, the method includes providing instructions to the device facilitating modifying the presentation of the UI element to a transaction state. The transaction state includes one or more components facilitating a transaction associated with one of the plurality of products associated with a content item. The instructions facilitating modification of the presentation of the UI element to a transaction state may be provided responsive to a user selection of a component of the UI element associated with a product.

In some embodiments, instructions facilitating presentation of a content item may include an indication of a portion of the content item to present. The portion of the content item may cover the one of the plurality of products associated with the one of the plurality of visual components. In some embodiments, one or more instructions may be provided to the device responsive to obtaining a history of the user. The history of the user may include one or more interactions with content items associated with products. In some embodiments, the content item is a live-streamed video. In some embodiments, the content item is a short-form video.

In another aspect, a non-transitory machine readable storage medium stores instructions which, when executed, cause a processing device to perform operations including presenting a UI. The UI includes one or more graphical representations of one or more videos. Each graphical representation of a respective video is selectable to initiate playback of the respective video and is displayed with a UI element in a collapsed state. The UI element includes information identifying a plurality of products covered by the respective video. The operations further include continuing to present a graphical representation of the respective video while modifying a presentation of the UI element from the collapsed state to an expanded state. The modification may be performed responsive to a user interaction with the UI element in the collapsed state. The UI element in the expanded state may include a plurality of visual components. Each visual component may be associated with one of the plurality of products. The operations further include initiating playback of the respective video covering a product associated with the selected visual component. Initiating playback may be performed responsive to a user selection of one selected visual component of the plurality of visual components.

In some embodiments, the operations include modifying the presentation of the UI element from the expanded state to a product focused state. The modification may be performed responsive to a user selection of one of the plurality of visual components of the UI element in the expanded state. The UI element in the product focused state may include detailed information about the product associated with the selected visual component.

In some embodiments, the operations further include modifying the presentation of the UI element to a transaction state. Modifying the presentation of the UI element may be performed responsive to a user selection of a component of the UI element associated with a product. The UI element in the transaction state facilitates a transaction associated with the product.

In some embodiments, the UI element may include tabs. The UI element may include a first tab associated with the plurality of products. The UI element may include a second tab associated with a plurality of portions of the respective video. The contents of the first tab may be presented by default. In some embodiments, initiating playback of the respective video includes presenting a portion of the video depicting a product. The product may be associated with a selected visual component of the UI element.

Optional features of one aspect may be combined with other aspects where appropriate.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
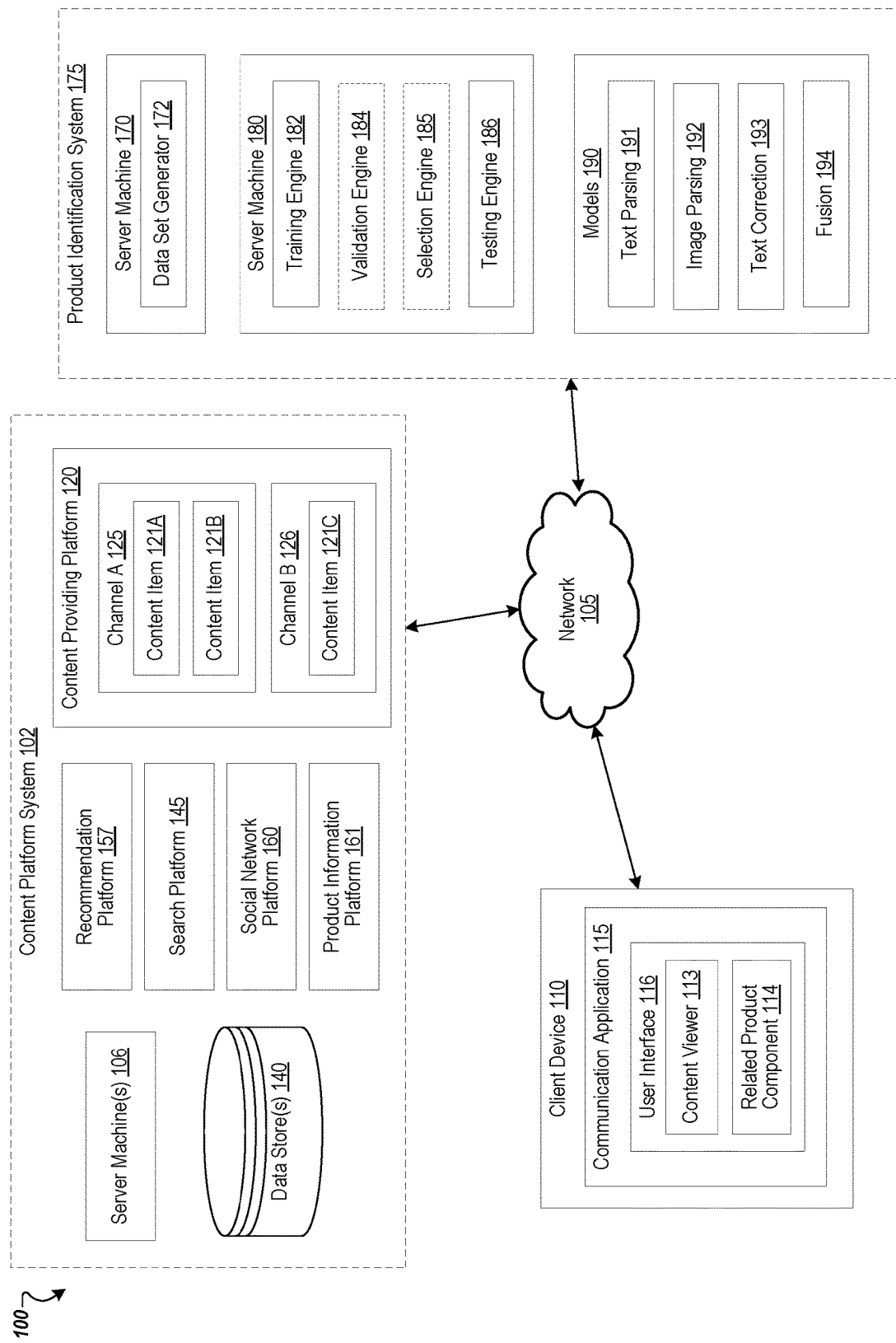
FIG. 1 illustrates an example system architecture for providing related and associated product information, according to some embodiments.

Aspects of the present disclosure relate to methods and systems for facilitating pairing of media items (e.g., content items, content, etc.) and associated products. A platform (e.g., a content sharing platform, etc.) can enable a user to access a media item (e.g., a video item, an audio item, etc.) hosted by the platform (e.g., via a client device connected to the platform). The platform can provide a client device of the user with access to the media item (e.g., by transmitting the media item to the client device of the user, etc.) via a network (e.g., the internet). A media/content item may have one or more additional associated activities that can deepen the engagement of a user with the content item. For example, engagement activities may include a comments section for the content item, a live chat associated with the content item, etc. Some content items may be related to one or more products. For example, products may be displayed as part of a content item, products may be reviewed in a content item, a content item may be associated with (e.g., sponsored by a company connected to) one or more products, or the like.

In conventional systems, identifying products associated with a content item may be difficult, inconvenient, time-consuming, etc. A content platform (e.g., a platform providing content for presentation to users) may have difficulty identifying products associated with a content item. In some systems, a content creator may identify one or more products associated with a content item, content channel, list of content items, or the like. In some systems, a content creator may include information about the one or more products in the content item, e.g., photos of items, items appearing in a video, etc. In some systems, a content creator may include information about one or more products in one or more fields associated with the content item, e.g., content item title, content item description, content item comments (e.g., a pinned comment), etc.

In conventional systems, a user may not be able to easily ascertain if a content item has one or more associated products. A content item may not have an indicator of associated products. A user may need to be presented with the content item (e.g., watch a video) to ascertain whether or not the content item has one or more associated products.

In conventional systems, a user may have difficulty identifying products associated with a content item. There may be no immediate indication (e.g., while choosing a content item to consume, to view, etc.) that a content item has associated products. Product information may be difficult to find, e.g., spread between different fields such as content item title, content item description, a comment section, etc. Product information may be included in the content item, e.g., a video may include audio describing the one or more products, an image item may include an image of one or more products, etc. Extracting this information from the content item may be difficult, time consuming, prone to error, etc.

In conventional systems, receiving additional information about a product featured in a content item may be difficult, time consuming, etc. In some systems, a product may appear in a content item (e.g., may appear in a video). A user may not be given additional information (e.g., product name, merchant name, etc.), and may perform searching independent of the content platform to learn more information about the product. A name and/or merchant associated with a product may be provided (e.g., in the description or title of a content item). A user may perform a search (e.g., independent of the content platform) to learn more information about the product, such as product variations, related products, availability and price, or the like. Directions to facilitate learning more about a product may be provided (e.g., directions to a user, directions to a processing device in the form of a link to a merchant website, etc.). The user may receive the additional information from a separate source (e.g., website), independent of the content platform.

In conventional systems, information about a product included in a content item may become outdated. For example, within a content item or a related field (e.g., content item title, content item description, content item comments, etc.), a content creator may include additional information about one or more products such as price information, merchant information, availability information, alternative versions or variation information, etc. Some information included in the content item or associated fields may not be updated with changes to this information, may be dependent on content creator updates, or the like.

In conventional systems, there may be obstacles that cause it to be difficult, time-consuming, cumbersome, etc., for a user to purchase one or more items associated with a content item. A user may search for the product, search for merchants stocking or selling the product, etc. In some embodiments, a content item or an associated field may include instructions to purchase an item (e.g., a description of a content item may include one or more links to products associated with the content item). The user may be directed to another platform independent of the content platform for completing a purchase of one or more products.

It can take a significant amount of time and computing resources for a user to find information about products covered by a content item. For example, a video may be long and may feature a product of interest towards to the end. It can take a significant amount of time for the user to consume the video to obtain accurate information about the product of interest, thereby resulting in increased use of computing resources of the client device. In addition, computing resources of the client device that enable the user to consume the media item can be unavailable for other processes, which can decrease overall efficiency and increase overall latency of the client device.

Aspects of the present disclosure may address one or more of these shortcomings of conventional methods. In some embodiments, aspects of the present disclosure may enable automated identification of products featured and/or included in a content item. In some embodiments, aspects of the present disclosure may enable the use of a model to identify products from text associated with a content item. The text may include a title of the content item, a description of a content item, captions associated with the content item, etc. The captions may be machine-generated captions, e.g., generated by a speech-to-text model for a video or audio content item. The model may be a machine learning model. The model may output a confidence value indicative of a likelihood the content item includes a product.

In some embodiments, aspects of the present disclosure may enable the use of a model to identify products from images of a content item. The content item may be or include a picture. The content item may be or include a video. One or more images of the content item may be provided to a model configured to identify products from images. The model may reduce the dimensionality of an image. The model may search for similar images associated with products. The model may search for similar dimensionally reduced images in a reduced dimensional space. The model may be a machine learning model. The model may output a confidence value indicative of a likelihood the content item includes a product.

In some embodiments, aspects of the present disclosure enable the use of a model (e.g., a fusion model) to ascertain whether a product is included in a content item. The fusion model may receive indications of one or more products detected by a model receiving text associated with a content item as input. The fusion model may receive indications of confidence values that the one or more products are included in the text. The fusion model may receive indications of one or more products detected by a model receiving images of the content item as input. The fusion model may receive indications of confidence values that the one or more products are included in the images. The fusion model may determine a confidence that one or more products appear in the content item and associated data (e.g., title, description, etc.). The fusion model may be a machine learning model.

In some embodiments, product detection may be utilized to improve content or associated information (e.g., description, captions). A model may be provided with data associated with a content item. For example, a model may be provided with machine-generated captions of a content item. The model may identify one or more captions that may be misrepresentations of product names (e.g., the machine-generated captions may include a closest English equivalent to a spoken product name). A model may be provided with one or more images of the content item. The model may determine a likelihood that one or more products are included in the images. Information associated with the content item (e.g., metadata, description, captions, etc.) may be updated in view of one or more detected products.

In some embodiments, aspects of the present disclosure enable an indicator of a content item with one or more associated products. A list of content items may include one or more indicators that one or more of the content items in the list includes associated products. An indicator may include a visual indicator (e.g., a "shopping" symbol or text indicative of one or more products displayed in association with the content item), an additional field (e.g., a panel including product information), or the like. In some embodiments, a list of content items may be presented to a user via a user interface (UI). The UI element may be associated with the content platform (e.g., may be presented via an application associated with the content providing platform). The UI may include an element indicating that a content item is associated with one or more products. In some embodiments, user interaction with the UI element may cause presentation of an additional UI element with additional information, e.g., a list of products associated with the content item.

In some embodiments, aspects of the present disclosure enable identification by a user of products associated with a content item. In some embodiments, a list of content items for presentation to a user may include a list of products associated with one or more content items. For example, a list of content items may be displayed to a user via a UI. The UI may include one or more UI elements presenting to the user one or more products associated with a content item. The UI elements may be provided via an application associated with the content providing platform of the content item. In some embodiments, the UI element listing products associated with a content item may be presented responsive to detecting a user interaction with a UI element indicating that a content item has associated products. In some embodiments, user interaction with a product of a list a products may cause the UI to present additional information to the user.

In some embodiments, aspects of the present disclosure enable providing additional information about one or more products associated with a content item to a user. A UI element may be provided to the user that provides additional information about a product. The UI element may provide information such as variations of the product (e.g., color variations, size variations, etc.), related products, availability and/or price (e.g., associated with one or more merchants), etc. The UI element may be provided via an application associated with the content item, a content providing platform, etc. The UI element displaying additional product information may be presented responsive to a user interaction with another UI element, e.g., selecting the content item for viewing, selecting a UI element indicating one or more associated products, etc. In some embodiments, upon user interaction with the UI element, a further UI element may be provided, for example to facilitate purchasing the product.

In some embodiments, aspects of the present disclosure enable automatic updating of information connected to one or more products associated with a content item. In some embodiments, the content providing platform associated with the content item may include, communicate with, be connected to, etc., one or more memory devices including product data. For example, a content platform may maintain and update a database of information associated with products, and changes made to the database may be reflected in a UI element presented to a user.

In some embodiments, aspects of the present disclosure enable a simplified purchasing procedure of a user. Upon receiving an indication of a user's intention to purchase a product (e.g., upon a user interaction with a UI element associated with the product), a UI element may be presented to the user to facilitate purchasing the product. In some embodiments, a user may purchase the product via an application associated with the content item, the content providing platform, etc. In some embodiments, a user may be directed to one or more external merchants (e.g., merchant applications, merchant webpages, etc.) to purchase the product.

In some embodiments, UI elements associated with products may be provided responsive to various operations of an application (e.g., an application associated with a content platform). A UI element associated with products may be provided as part of a list of content items tailored to a user, e.g., tailored to a user account associated with the user. A UI element associated with products may be provided as part of a list of content times related to a previously presented content item, e.g., a watch next list, a recommended video list, etc. A UI element associated with products may be provided as part of a list of content items generated responsive to a user search. A UI element associated with products may be provided as part of a product-specific list, e.g., a shopping section of an application associated with a content platform. Inclusion of a UI element associated with products, a content item associated with products, the number of UI elements or content items presented associated with products, etc., may be based on a number of metrics. Metrics may include user watch history, user search history, etc.

In some embodiments, aspects of the present disclosure may enable quick access to one or more portions of a content item that are relevant to a product. For example, a UI element may include a list of products that are associated with a content item. One or more of the list of products may be associated with a portion of the content item, e.g., a time stamp of a video content item. Upon interaction with the portion of the UI element related to a product, the content item may present the relevant portion of the content item (e.g., a video may begin playing a portion of the video associated with the content item). In some embodiments, a list of products associated with a content item may be updated as the content item is presented. For example, a list of products associated with a video may rearrange as the video is played. For example, a product currently highlighted by the video may be on top of a list of products, products currently on screen may be grouped together in a product presentation UI element, etc.

Aspects of the present disclosure may provide technical advantages over previous solutions. Aspects of the present disclosure may enable automatic product detection in content items. This may improve a content creator's experience by automatically associating one or more products with a content item (e.g., removing the burden of associating products with the content item from the creator). Automatically generated product associations may be of improved accuracy, due to the use of multiple sources (e.g., text and image searches for products), a fusion model, etc. Model-based product detection may be utilized to improve a content item, associated data, etc., for example utilizing object detection may improve machine-generated captions or descriptions of content items. More accurate captions may improve a user's experience in consuming a content item. These improvements may reduce the time required of a content creator to generate accurate content, may reduce the time spent by a user to discover content items and/or products that the user is interested in, may increase the accuracy of machine-generated information associated with a content item, etc. Accordingly, computing resources at a client device associated with the content creator, the content viewer and/or the platform are reduced and are available for other processes, which increases an overall efficiency and decreases an overall latency for the system.

Aspects of the present disclosure may improve a user's experience while searching for content items, viewing content items, scrolling through a list of content items, etc. A user may be able to identify content items with associated products from a list of content items, e.g., without being presented the content item. A user may be provided with a seamless method for increasing engagement with products associated with a content item, e.g., interaction with a UI element indicating that there are products associated with a content item may cause presentation of a content item with further information about one or more products, further interaction may facilitate purchasing one or more products, etc. Presentation of one or more UI elements may streamline a user's experience. A user may be able to retrieve additional information easily, e.g., within an application associated with the content platform/content item. A user may be able to purchase a product associated with a content item more easily. A user may be directed to a relevant portion of a content item based on expressed interest in a product associated with the content item. A user may be able to easily view price information, availability information, product variations, related products, etc., within the context of a single application. Such implementations may save a user time and frustration, may simplify a shopping and/or purchasing process, may simplify a product research, review, and/or selection process, or the like.

FIG. 1 illustrates an example system architecture 100 for providing content and associated product information, according to some embodiments. System architecture 100 includes client device 110, one or more networks 105, content platform system 102, and product identification system 175. Content platform system 102 includes one or more server machines 106, one or more data stores 140, and may include a variety of platforms targeted at performing tasks (e.g., tasks associated with content delivery). Platforms of content platform system 102 may be hosted by one or more server machines 106. Platforms of content platform system 102 may include and/or be hosted on one or more computing devices (such as a rackmount server, a router computer, a server computer, a personal computer, a mainframe computer, a laptop computer, a tablet computer, a desktop computer, etc.) and one or more data stores (e.g., hard disks, memories, and databases) and may be coupled to the one or more networks 105. In some embodiments, components of content platform system 102 (e.g., server machines 106, data stores 140, hardware associated with one or more platforms, etc.) may be directly connected to one or more networks 105. In some embodiments, one or more components of content platform system 102 may access networks 105 via another device, e.g., a hub, switch, etc. In some embodiments, one or more components of content platform system 102 may communicate directly with other components depicted in FIG. 1, e.g., components of product identification system 175 such as server machines 170 and/or 180. Data stores 140 may be included in one or more server machines 106, include external data storage, etc. Platforms of content platform system 102 may include advertisement platform 165, social network platform 160, recommendation platform 157, search platform 145, and content providing platform 120. Product identification system 175 includes server machine 170, server machine 180, and a set of models 190. Product identification system 175 may include further devices, e.g., data stores, further servers, etc. Multiple operations of product identification system 175 may be performed by a single physical or virtual device.

The one or more networks 105 may include one or more public networks (e.g., the Internet), one or more private networks (e.g., a local area network (LAN), a wide area network (WAN), one or more wired networks (e.g., Ethernet network), one or more wireless networks (e.g., an 802.11 network), one or more cellular networks (e.g., a Long Term Evolution (LTE) network), routers, hubs, switches, server computers, and/or a combination thereof. In one implementation, some components of architecture 100 are not directly connected to each other. In one implementation, system architecture 100 includes separate networks 105.

The one or more data stores 140 may reside in memory (e.g., random access memory), cache, drives (e.g., hard drive), flash drives, etc., and may be part of one or more database systems, one or more file systems, or another type of component or device capable of storing data. The one or more data stores 140 may include multiple storage components (e.g., multiple drives or multiple databases) that may also span multiple computing devices (e.g., multiple server computers). The data store may be persistent storage that is capable of storing data. A persistent storage may be a local storage unit or a remote storage unit, electronic storage units (e.g., main memory), or a similar storage unit. Persistent storage may be a monolithic device or a distributed set of devices.

Content items 121A-C (e.g., media content items) may be stored on one or more data stores. The data stores may be part of one or more platforms. Examples of a content item 121 may include, and are not limited to, digital video, digital movies, animated images, digital photos, digital music, digital audio, digital video games, collaborative media content presentations, website content, social media updates, electronic books, electronic journals, digital audio books, web blogs, software applications, etc. Content items 121A-C may also be referred to as media items. Content items 121A-C may be pre-recorded or live-streamed. For brevity and simplicity, a video may be used as an example of a content item 121 (e.g., content item 121A) throughout this document. The video may include a pre-recorded video, a live-streamed video, a short-form video, etc.

Content items 121A-C may be provided by content providers. A content provider may be a user, a company, an organization, etc. A content provider may provide a content item 121 (e.g., content item 121A) that is a video. A content provider may provide content item 121 that comprises live-streamed content, e.g., content item 121 may include live-streamed video, a live chat associated with the video, etc.

Client devices 110 may include devices, such as televisions, smart phones, personal digital assistants, portable media players, laptop computers, electronic book readers, tablet computers, desktop computers, gaming consoles, set-top boxes, or the like.

A client device 110 may include a communication application 115. A content item 121 (e.g., content item 121A) may be consumed by a user via the communication application 115. For example, communication application 115 may access one or more networks 105 (e.g., the internet) via hardware of client device 110 to provide content item 121 to the user. As used herein, "media," "media item," "online media item," "digital media," "digital media item," "content," "media content item," and "content item" may include an electronic file that can be executed or loaded using software, firmware, and/or hardware configured to present a content item. In one implementation, the communication application 115 may be an application that allow users to compose, send, and receive content items 121 (e.g., videos) over a platform (e.g., content providing platform 120, recommendation platform 157, social network platform 160, and/or search platform 145) and/or a combination of platforms and/or networks.

In some embodiments, the communication application 115 may be (or include aspects of) a social networking application, video sharing application, video streaming application, video game streaming application, photo sharing application, chat application, or a combination of such applications. The communication application 115 associated with client device 110 may render, display, present and/or play one or more content items 121 to one or more users. For example, communication applications 115 may provide user interfaces 116 (e.g., a graphical user interface) to be displayed on endpoint device 110 for receiving, and/or playing video content. In some embodiments, communication application 115 is associated with (and managed by) content platform 102 or content providing platform 120.

In some embodiments, communication application 115 may include content viewer 113 and related product component 114. User interface 116 (UI) may display content viewer 113 and related product component 114. Related product component 114 may be used to display a UI element that displays information concerning one or more products (e.g., one or more products associated with a content item). Related product component 114 may display a UI element to inform a user that a content item has one or more associated products (e.g., related product component 114 may cause display of a "shopping" symbol displayed proximate to content viewer 113, related product component 114 may cause an element to be displayed proximate to an element for selecting the content item for presentation from a list of content items and indicate that the content item has one or more associated products, or the like). Related product component 114 may cause the UI to display information about one or more products associated with a content item (e.g., related product component 114 may cause display of a UI that may include a list of products associated with the content item, may include images of products associated with the content item, may include price information or information connecting the product to the content item such as a time stamp of a portion of a video relevant to the product, etc.). Related product component 114 may cause a UI element to display additional information about one or more products, e.g., variations of the product (e.g., color variations, size variations, etc.), related products, recommended products, etc. Related product component 114 may cause a UI element to display one or more options for purchasing one or more products. In some embodiments, a user may be able to navigate between different views provided by related product component 114. Further description of example UI elements associated with products related to a content item may be found in connection with FIGS. 4A-E.

In some embodiments, related product component 114 may cause more than one UI element to be displayed, e.g., if more than one content item with associated products is displayed. In some embodiments, related product component 114 may cause a UI element indicative of related products to not be displayed, for example based on user settings, user preference, user history, etc. In some embodiments, multiple content viewers 113 and/or related product components 114 may be associated with one user interface, communication application, client device, etc. For example, multiple content items may be displayed for a user at once. In some implementations, communication application 115 is a web browser that can access, retrieve, present, and/or navigate content (e.g., web pages such as Hyper Text Markup Language (HTML) pages, digital media items, etc.) and can include related product component 114 and content viewer 113, which may be an embedded media player that is embedded in user interface 116 (e.g., a web page associated with viewing content) provided by content providing platform 120. Alternatively, application 115 is not a web browser and is a stand-alone application (e.g., mobile application, desktop application, gaming console application, television application, etc.), that is downloaded from a platform (e.g., content providing platform 120, recommendation platform 157, social network platform 160, or search platform 145) or pre-installed on the client device 110. The stand-alone application 115 can provide user interface 116 including content viewer 113 (e.g., embedded media player) and related product component 114.

In some embodiments, content platform system 102 may include product information platform 161 (e.g., hosted by server machine 106). Product information platform 161 may store, retrieve, provide, receive, etc., data related to one or more products associated with one or more content items. Content platform system 102 may provide data to related product component 114 of client device 110. Product information platform 161 may include information provided by a content creator, e.g., a content creator may provide a list of products associated with a content item the content creator provided to content platform system 102. Product information platform 161 may include information provided by one or more users, e.g., one or more users may identify products associated with a content item, e.g., in response to having the content item presented to them. Product information platform 161 may include information provided by product identification system 175, e.g., one or more machine learning models may be utilized to identify products featured in a content item, and provide indications of associated products and content items to product information platform 161.

In some embodiments, communication applications 115 installed on client devices 110 may be associated with a user account, e.g., a user may be signed in to an account on the client device 110. In some embodiments, multiple client devices 110 may be associated with the same client account. In some embodiments, providing information regarding product association(s) with one or more content items may be performed subject to the user account, e.g., account settings, account history (e.g., history of engaging with UI elements including associated product information), etc.

In some embodiments, client devices 110 may include one or more data stores. Data stores may include commands (e.g., instructions, which cause operations when executed by a processing device) to render a UI (e.g., user interface 116). The instructions may include instructions to render an interactive component, e.g., a UI element a user may interact with to be presented additional information about one or more products associated with a content item. In some embodiments, the instructions may cause a processing device to render a UI element presenting information about one or more products associated with one or more content items (e.g., a number of videos reviewing a product of interest to the user may be presented with a UI element presenting more information about the product).

In some embodiments, the one or more server machines 106 may include computing devices such as rackmount servers, router computers, server computers, personal computers, mainframe computers, laptop computers, tablet computers, desktop computers, etc., and may be coupled to one or more networks 105. Server machines 106 may be independent devices or part of any of the platforms (e.g., content providing platform 120, social network platform 160, etc.).

Social network platform 160 may provide an online social networking service. The social networking platform 160 may provide a communication application 115 for users to create profiles and perform activities with their profiles. Activities may include updating the profile, exchange messages with other users, evaluating (e.g., like, comment, share, recommend) status updates, photos, videos, etc., and receiving notifications associated with other users' activity. In some embodiments, additional product information (e.g., as provided by product information platform 161) may be shared by a user with one or more additional users via social network platform 160.

Recommendation platform 157 may be used to generate and provide content recommendations (e.g., articles, videos, posts, news, games, etc.). Recommendations may be based on search history, content consumption history, followed/subscribed channel content, linked profiles (e.g., friend lists), popular content, etc. Recommendation platform 157 may be utilized to generate, for example, a user home feed, a user watch list, a user playlist, etc. One or more UI elements indicative of associated products, displaying a list of associated products, presenting product information, presenting one or more options to purchase a product, etc., may be presented in combination with, as part of, in association with, accessible from, or the like, a home feed, a watch list, a playlist, a watch next list, etc. Presentation of one or more UI elements may be performed based on a user history, user settings, data indicative of a user's preference (e.g., demographic data), etc.

Search platform 145 may be used to allow users to query the one or more data stores 140 and/or one or more platforms and receive query results. Search platform 145 may be utilized by a user to search for a content item, to search for a topic, or the like. For example, search platform 145 may be utilized by a user to search for a content item with one or more associated products. Search platform 145 may be utilized to search for content items related to a type of product (e.g., headphone review videos). Search platform 145 may be utilized to search for content items related to a certain product (e.g., a particular make and/or model of headphones). One or more UI elements may be displayed to a user responsive to receiving a search query. The type, style, etc., of UI elements displayed may be based on the content of the user's search. For example, responsive to a search for content related to a type of product (e.g., headphones), a UI element may be displayed to indicate that a content item suggested in view of the search has one or more associated products. As a further example, responsive to a search for a content item related to a more specific product (e.g., "best headphones for podcasting"), a different UI element may be displayed to provide information about products associated with a content item. As a further example, responsive to a search for a content item related to a specific product (e.g., a particular make and/or model), a different UI element may be displayed to provide specific information about the searched product, indicating the product is associated with a content item recommended in view of the search.

Content providing platform 120 may be used to provide one or more users with access to content items 121 and/or provide the content items 121 to one or more users. For example, content providing platform 120 may allow users to consume, upload, download, and/or search for content items 121. In another example, the content providing platform 120 may allow users to evaluate content items 121, such as approve of ("like"), disapprove of, recommend, share, rate, and/or comment on content items 121. In another example, the content providing platform 120 may allow users to edit content items 121. The content providing platform 120 may also include a website (e.g., one or more webpages) and/or one or more applications (e.g., communication applications 115) that may be used to provide one or more users with access to the content items 121. For example, communication application 115 may be used by client device 110 to access content items 121. Content providing platform 120 may include any type of content delivery network providing access to content items 121.

Content providing platform 120 may include multiple channels (e.g., channel A 125, channel B 126, etc.). A channel may be a collection of content available from a common source, a collection of content having a common topic or theme, etc. The data content may be digital content chosen by a user, digital content made available by a user, digital content uploaded by a user, digital content chosen by a content provider, digital content chosen by a broadcaster, etc. For example, channel A 125 may include two videos (e.g., content items 121A-B). A channel may be associated with an owner, who may be a user that can perform actions on the channel. The content may be one or more content items 121. The data content of the channels may be pre-recorded content, live content, etc. although channels are described as one implementation of a content providing platform, implementations of the disclosure are not limited to content sharing platforms that provide content items 121 via a channel model.

Product identification system 175, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc. Operations of predictive server 112, server machine 170, server machine 180, data store 140, etc., may be performed by a cloud computing service, cloud data storage service, etc.

Product identification system 175 may include one or more models 190. Models 190 including in product identification system 175 may perform tasks related to identifying one or more products from content items. One or more models of models 190 may be trained machine learning models. Operations of generating a trained machine learning model, including training, validating, and testing the model, are described in connection with FIGS. 3A and 5C.

Models 190 may include one or more text parsing models 191. Text parsing models 191 may be configured to receive as input text and generate as output one or more indications of products associated with the text. For example, a first model of text parsing models 191 may be configured to predict associated products from a title of a content item, a second model of text parsing model 191 may be configured to predict associated products from a (e.g., written) description of a content item, a third model may be configured to predict associated products from captions (e.g., automatically generated captions, machine generated captions, user-provided captions, etc.) of a content item, etc. In some embodiments, all operations of text parsing models 191 may be performed by a single model. In some embodiments, a model of text parsing models 191 may be configured to generate as output product contextual information, e.g., information indicating that a content item is associated with one or more products. For example, product contextual information may indicate that a content item includes categories of products, e.g., a group of different products (e.g., type of product, brand of product, a category of product such as "electronics," or the like).

Models 190 may include one or more image parsing models 192. Image parsing models 192 may be configured to identify products from one or more images. Image parsing models 192 may include one or more models directing at identifying that an image includes products, models configured to isolate a product image from a content item image (e.g., remove background element, etc.), models configured to determine the identity of a product in a content item image, etc. Operations of image parsing models 192 may be performed by a single model. Image parsing models 192 may include one or more models configured to provide images to product identification models. For example, image parsing models 192 may include models configured to extract a portion of a still image of a content item, models configured to extract one or more frames of a video content item, etc. A model of image parsing models 192 may be provided one or more frames of a video, one or more portions of one or more frames of a video, etc., and generate as output one or more products and one or more confidence values associated with the one or more products. For example, a model of image parsing models 192 may receive one or more frames of a video content item as input, and generate as output a list of products with confidence values indicative of a likelihood that the products are included in the images of the content item. Image parsing models 192 may include one or more models that determine which images to utilize from a content item. For example, image parsing models 192 may include one or more models that select frames from a video content item for image identification.

Image parsing models 192 may include one or more models configured to reduce the dimensionality of an image. For example, an image may be reduced to a vector of values. In some embodiments, one or more models of image parsing models 192 may be configured to reduce dimensionality of an image in such a way that similar images (e.g., images of the same product) may be represented similarly (e.g., by similar vectors) after dimensional reduction. One or more models of image parsing models 192 may be configured to compare a reduced dimensionality image from a content item (e.g., a vector of values generated from one or more frames of a content item video) to a reduced dimensionality image of a known product (e.g., via product information platform 161).

Models 190 may include text correction models 193. Text correction models 193 may be configured to provide corrections to text associated with a content item. Text correction models 193 may be configured to adjust text associated with a content item to include one or more products referenced in the content item. One or more models of text correction models 193 may be configured to adjust computer-generated, machine-generated, automatically-generated, etc., text associated with a content item One or more models of text correction models 193 may be configured to update captions of a video (e.g., incorrect captions) to include one or more products. In some embodiments, machine-generated text (e.g., captions) associated with a content item may be incorrect. For example, the name of a product may be replaced with an approximation in generation of captions (e.g., the name of the product may not be a word of the language of the captions, the name of a product may be a word in a different language than the language of the captions, etc.). Models of text correction models 193 may be configured to identify portions of text that may be incorrect and recommend corrections, perform corrections, alert a user or another system, etc. For example, a model of text correction models 193 may receive machine generated captions of a video, identify a portion of the captions that may incorrectly substitute a word in the language of the captions for a product name, and provide data indicating the potentially incorrect text to another model, system, user, etc.

Models 190 may include fusion model 194. Fusion model 194 may receive as input one or more indications of products associated with a content item. In some embodiments, fusion model 194 receives as input, output from one or more other models (e.g., text parsing models 191, image parsing models 192, etc.). Fusion model 194 may receive one or more indications of products, and one or more indications of confidence values, associated with a content item. For example, fusion model 194 may receive an indication of one or more products and confidence values associated with the one or more products detected in a title of a content item. Fusion model 194 may further receive an indication of one or more products and confidence values associated with the one or more products detecting in a description of a content item. Fusion model 194 may further receive an indication of one or more products and confidence values associated with one or more products detected in captions of a content item. Fusion model 19 may further receive an indication of one or more products and confidence values associated with the one or more products detected in images of a content item. Fusion model 195 may generate as output one or more products detected in association with a content item. Fusion model 195 may further generate a confidence value associated with a confidence that a product appears in the content item, is associated with the content item, etc. Further operations may be performed (e.g., a UI element describing products associated with the content item may be presented) based on the output of the fusion model 195 (e.g., product identity information and confidence values).

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs).

A recurrent neural network (RNN) is another type of machine learning model. A recurrent neural network model is designed to interpret a series of inputs where inputs are intrinsically related to one another, e.g., time trace data, sequential data, etc. Output of a perceptron of an RNN is fed back into the perceptron as input, to generate the next output.

Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In some embodiments, product identification system 175 further includes server machine 170 and server machine 180. Server machine 170 includes a data set generator 172 that is capable of generating data sets (e.g., a set of data inputs and a set of target outputs) to train, validate, and/or test model(s) 190, including one or more machine learning models. Some operations of data set generator 172 are described in detail below with respect to FIGS. 2 and 5A. In some embodiments, data set generator 172 may partition historical data (e.g., pre-existing content item data, content items with one or more designated associated products, content items with product assignments provided by one or more users, etc.) into a training set (e.g., sixty percent of the historical data), a validating set (e.g., twenty percent of the historical data), and a testing set (e.g., twenty percent of the historical data).

In some embodiments, components of product identification system 175 may generate multiple sets of features. For example, a feature may be a rearrangement of input data, a combination of input data, a dimensional reduction of input data, a subset of input data, or the like. One or more data sets may be generated based on one or more features of input data.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training one or more models 190 using one or more sets of features associated with the training set from data set generator 172. The training engine 182 may generate multiple trained models 190, where each trained model 190 corresponds to a distinct set of features of the training set. Data set generator 172 may receive the output of a trained model (e.g., fusion model 194 may be trained based on output of text parsing models 191 and/or image parsing models 192), collect that data into training, validation, and testing data sets, and use the data sets to train a second model (e.g., fusion model 194).

Validation engine 184 may be capable of validating a trained model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained models 190 based on the corresponding sets of features of the validation set. Validation engine 184 may discard trained models 190 that have an accuracy that does not meet a threshold accuracy. In some embodiments, selection engine 185 may be capable of selecting one or more trained models 190 that have an accuracy that meets a threshold accuracy. In some embodiments, selection engine 185 may be capable of selecting the trained model 190 that has the highest accuracy of the trained models 190.

Testing engine 186 may be capable of testing a trained model 190 using a corresponding set of features of a testing set from data set generator 172. For example, a first trained machine learning model 190 that was trained using a first set of features of the training set may be tested using the first set of features of the testing set. Testing engine 186 may determine a trained model 190 that has the highest accuracy of all of the trained models based on the testing sets.

In the case of a machine learning model, model 190 may refer to the model artifact that is created by training engine 182 using a training set that includes data inputs and corresponding target outputs (correct answers for respective training inputs). Patterns in the data sets can be found that map the data input to the target output (the correct answer), and machine learning model 190 is provided mappings that capture these patterns. The machine learning model 190 may use one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, decision forest, neural network (e.g., artificial neural network, recurrent neural network), linear model, function-based models (e.g., NG3 models), etc. Synthetic data generator 174 may include one or more machine learning models, which may include one or more of the same types of models (e.g., artificial neural network).

Automatic (e.g., model-based) detection of products from content items and associated data provides significant technical advantages over other methods. In some embodiments, a content item featuring a product (e.g., a product review video reviewing the product) may become linked or associated with the product (e.g., data may be generating linking the product to the content item) without the attention, action, time, etc., of the content creator. In some embodiments, a content item advertising a product (e.g., a content item may be sponsored or may promote one or more products) may be linked or associated with the product. Model-based detection of products in content items may generate product associations for products not specifically featured in a content item, but present in the content item (e.g., a product a user may be interested in purchased may be on-screen in a video content item). Model-based detection of products in a content item may generate product associations for products advertised in a content item. A user may be directed toward a product present in a content item, based on model-based detection, by providing a UI element to the user, e.g., indicating a product is associated with the content item.

One or more models 190 may be run on input to generate one or more outputs. A model may determine (e.g., extract) confidence data from the output that indicates a level of confidence that the output of the model is an accurate depiction of a content item. For example, a model may determine that a first product is associated with a content item, and determine a confidence that the first product has been correctly discovered by the model in the content item. One or more components of product identification system 175 may use the confidence data to decide whether to update data associated with the content item, e.g., whether to associate one or more products with the content item, whether to update one or more captions of the content item, etc.

The confidence data may include or indicate a level of confidence that the output of the model (e.g., one or more products) is an accurate indication of products associated with the content item. For example, the level of confidence output by the model (e.g., in association with one product identified in a content item) may be a real number between 0 and 1 inclusive. 0 may indicate no confidence that the predicted product is associated with the content item, and 1 may indicate absolute confidence that the predicted product is associated with the content item. Responsive to the confidence data indicating a level of confidence below a threshold level for a predetermined number of instances (e.g., percentage of instances, frequency of instances, total number of instances, etc.) product identification system 175 may cause one or more trained models 190 to be re-trained (e.g., based on updated and/or new data for training, validating, testing, etc.). Retraining may include generating one or more data sets (e.g., via data set generator 172).

For purpose of illustration, rather than limitation, aspects of the disclosure describe the training of one or more machine learning models 190 using historical data and inputting current data (e.g., newly updated content items, content items not previously associated with products, etc.) into the one or more trained machine learning models to determine output indicative of content item-product association. In other embodiments, a heuristic model, physics-based model, or rule-based model is used to determine one or more products are associated with a content item (e.g., without using a trained machine learning model). In some embodiments, such models may be trained using historical data. In some embodiments, these models may be retrained utilizing a historical data. Any of the information described with respect to data inputs 210 of FIG. 2 may be monitored or otherwise used in the heuristic, physics-based, or rule-based model.

In some embodiments, the functions of client device 110, product identification system 175, content platform system 102, server machine 170, and server machine 180, server machine 106, may be provided by a fewer number of machines. For example, in some embodiments server machines 170 and 180 may be integrated into a single machine, while in some other embodiments, server machine 170, server machine 180, and server machine 106 may be integrated into a single machine. In some embodiments, client device 110 and server machine 106 may be integrated into a single machine. In some embodiments, functions of client device 110, server machine 106, server machine 170, server machine 180, and data store 140 may be performed by a cloud-based service.

In general, functions described in one embodiment as being performed by client device 110, server machine 106, server machine 170, and server machine 180 can also be performed on server machine 106 in other embodiments, if appropriate. In addition, the functionality attributed to a particular component can be performed by different or multiple components operating together. For example, in some embodiments, product identification system 175 may determine associations between products and content items. In another example, content platform system 102 may determine association between content items and one or more products.

In addition, the functions of a particular component can be performed by different or multiple components operating together. One or more of the server machine 106, server machine 170, or server machine 180 may be accessed as a service provided to other systems or devices through appropriate application programming interfaces (API).

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of one or more platforms, one or more content items, etc. Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
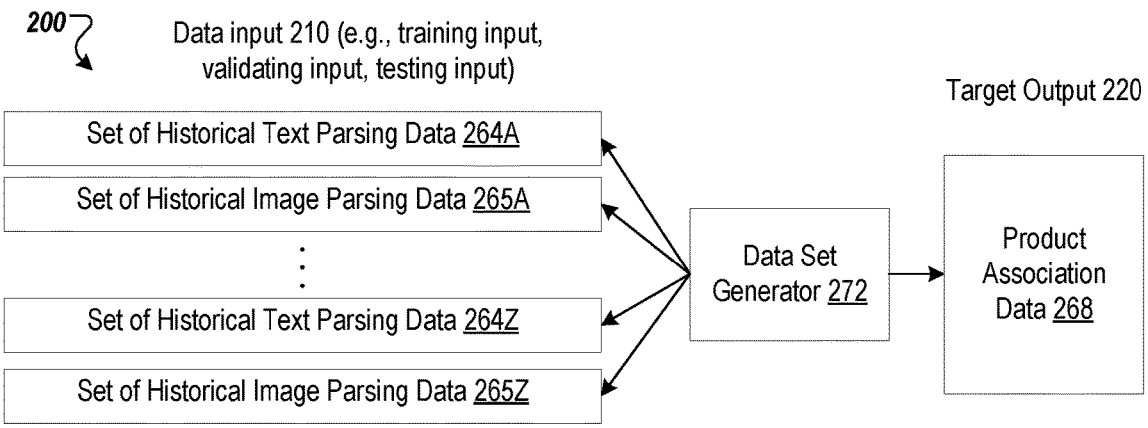
FIG. 2 is a block diagram of a system 200 including a data set generator for creating data sets for one or more models, according to some embodiments.

FIG. 2 is a block diagram of a system 200 including data set generator 272 for creating data sets for one or more models, according to some embodiments. Data set generator 272 may create data sets (e.g., data input 210, target output 220) using historical data. A data set generator similar to data set generator 272 may be utilized to train an unsupervised machine learning model, e.g., target output 220 may not be generated by data set generator 272. A data set generator similar to data set generator 272 may be utilized to train a semi-supervised machine learning model, e.g., target output 220 corresponding to a subset of data input 210 may be generated by data set generator 272.

Data set generator 272 may generate data sets to train, test, and validate a model. Data set generator 272 may generate data sets for a machine learning model. System 200 may generate data sets for training, testing, and/or validating a fusion model, e.g., for determining a likelihood that one or more products appear in a content item. A system similar to system 200 may generate data sets for training, testing, and/or validating a model with a different function, with corresponding changes to input data and/or output data included in the data sets. Models for parsing text (e.g., extracting one or more references to products from text associated with content items), parsing images (e.g., extracting one or more references to products from images associated with content items), correcting text (e.g., including one or more references to products in machine-generated text associated with a content item), etc., may have data sets for training, testing, and/or validating the models generated by a data set generator similar to data set generator 272.

In some embodiments, a data set generator such as data set generator 272 may be associated with two or more separate models (e.g., data sets may be used to train an ensemble model). For example, input data sets may be provided to a first model, output of the first model may be provided to a second model, and target output may be provided to the second model to train, test, and/or validate the first and second models (e.g., the ensemble model).

Data set generator 272 may generate one or more data sets to provide to a model, e.g., during training, validation, and/or testing operations. A machine learning model may be provided with sets of historical data. A machine learning model (e.g., a fusion model) may be provided with sets of historical text parsing data 264A-264Z as data input. Text parsing data may be provided by a machine learning model, e.g., may include one or more products and confidence values identified by a machine learning model in text associated with a content item. A machine learning model may be provided with sets of historical image parsing data 265A-265Z as data input. Image parsing data may be provided by a trained machine learning model, e.g., may include one or more products and confidence values identified by a machine learning model in one or more images associated with a content item.

In some embodiments, data set generator 272 may be configured to generate data sets for training, texting, validating, etc., a fusion model. A data set generator similar to data set generator 272 may generate sets of text data (e.g., content item title text, content item description text, content item captions text, etc.) as data input to train a machine learning model to determine one or more products associated with a content item. A data set generator similar to data set generator 272 may generate sets of image data (e.g., one or more frames from a video content item, portions of one or more frames from a video content item, etc.) as data input to train a machine learning model to determine one or more products associated with a content item.

In some embodiments, data set generator 272 generates a data set (e.g., training set, validating set, testing set) that includes one or more data inputs 210 (e.g., training input, validating input, testing input). Data inputs 210 may be provided to training engine 182, validating engine 184, or testing engine 186 of FIG. 1 The data sets may be used to train, validate, or test the model (e.g., a fusion model, a text parsing model, an image parsing model, etc.). Data set generator 272 may generate a data set (e.g., training set, validating set, testing set) that includes one or more data inputs 210. Data inputs 210 may be referred to as "features," "attributes," "vectors," or "information."

In some embodiments, data set generator 272 may generate a first data input corresponding to a first set of historical text parsing data 264A and/or a first set of historical image parsing data 265A to train, validate, or test a first machine learning model. Data set generator 272 may generate a second data input corresponding to a second set of historical metrology data 264B and/or a second set of design rule data 265B to train, validate, or test a second machine learning model. Some embodiments of generating a training set, testing set, validating set, etc., are further described with respect to FIG. 5A.

In some embodiments, data set generator 272 may generate target output 220 to provide to train, test, validate, etc., one or more machine learning models. Data set generator 272 may generate product association data 268 as target output 220. Product association data 268 may include identifiers of one or more products associated with a content item (e.g., a human-labeled product association). Product association data 268 may include input-output mappings, e.g., set of historical text parsing data 264A may be associated with a first set of product association data 268, etc. A machine learning model may be updated (e.g., trained) by providing input data, generating an output, and comparing it to a provided target output (e.g., the "correct answer"). Various weights, biases, etc., of the model are then updated to bring the model into better alignment with the training data. This process may be repeated many times to generate a model that provides accurate output for a threshold portion of provided inputs. Target output 220 may share one or more features of data input 210, e.g., target output 220 may be organized into attributes or vectors, target output 220 may be organized into sets A-Z, etc.

In some embodiments, a data set generator similar to data set generator 272 may be utilized in connection with a text parsing model, configured to determine one or more product associations with a content item. Product associations may include context associations, such as brands of products, types of products, classes of products, etc. A data set generator may generate as target output a list of products, types of products, brands of products, or the like, associated with a content item, associated with the text of a content item, etc. A data set generator similar to data set generator 272 may be utilized in connection with an image parsing model, configured to determine one or more product associations with a content item. The data set generator may generate as target output a list of products, classes of products, categories of products, etc., associated with the image input. A data set generator similar to data set generator 272 may be utilized in connection with a text correction model. A text correction model may be configured to recognize machine-generated text that incorrectly provides one or more words in a target language in place of a product name. A text correction model may be provided with one or more sets of machine-generated text as input data, and products associated with the text (e.g., products that were not correctly captured by the machine-generation of the text) as target output.

In some embodiments, subsequent to generating a data set and training, validating, or testing a machine learning model using the data set, the model may be further trained, validated, or tested, or adjusted (e.g., adjusting weights or parameters associated with input data of the model, such as connection weights in a neural network). The model may be adjusted and/or retrained based on different data than the original training operations, e.g., data generated after training, validating, and/or testing of the model.

Figure 3A:
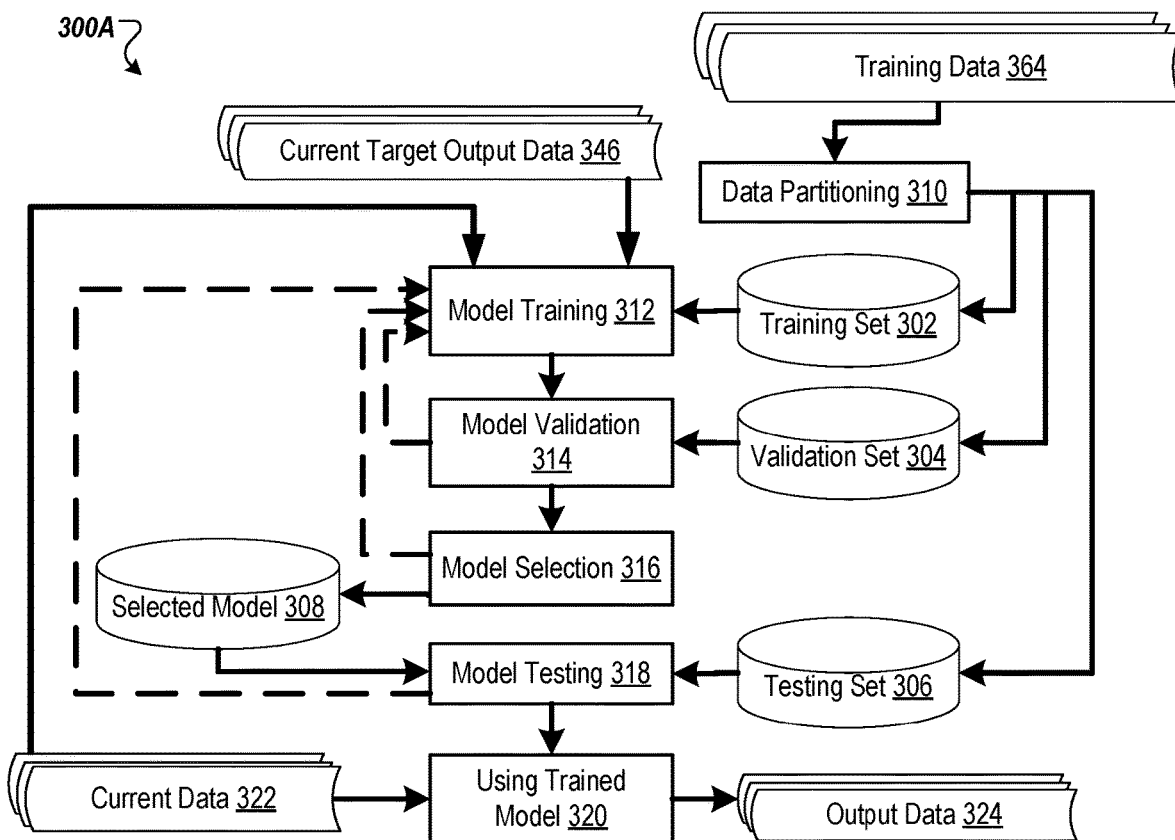
FIG. 3A is a block diagram illustrating a system for generating output data such as associations between products and content items, according to some embodiments.

FIG. 3A is a block diagram illustrating system 300A for generating output data (e.g., product/content item association data), according to some embodiments. System 300A may be used in conjunction with a fusion model to generate product/content item association data and confidence data, based on potential product/content item associations generated by other models (e.g., text-based models detecting products in text associated with the content item, image-based models detecting products in images associated with the content item, etc.). A system similar to system 300A may be utilized for generating output data from other types of models, e.g., a text parsing model, an image parsing model, a text correction model, etc.

At block 310, system 300A (e.g., components of product identification system 175 of FIG. 1) performs data partitioning (e.g., via data set generator 272 of FIG. 2) of data to be used in training, validating, and/or testing a machine learning model. In some embodiments, training data 364 includes historical data, such as historical associations between products and content items based on text, historical associations between products and content items based on images, etc. In some embodiments, e.g., when system 300A is directed at generating output from a fusion model, training data 364 may include data generated by one or more trained machine learning models, e.g., models configured to detect products in texts or images associated with a content item. Training data 364 may undergo data partitioning at block 310 to generate training set 302, validation set 304, and testing set 306. For example, the training set may be 60% of the training data, the validation set may be 20% of the training data, and the testing set may be 20% of the training data.

The generation of training set 302, validation set 304, and testing set 306 may be tailored for a particular application. For example, the training set may be 60% of the training data, the validation set may be 20% of the training data, and the testing set may be 20% of the training data. System 300A may generate a plurality of sets of features for each of the training set, the validation set, and the testing set. For example, if training data 364 includes product associations extracted from text data from more than one text source (e.g., a title associated with a content item and a description associated with a content item), the input training data may be divided into a first set of features including products identified from text from a first source and a second set of features including products identified in text from a second source. Either target input, target output, both, or neither may be divided into sets. Multiple models may be trained on different sets of data.

At block 312, system 300A performs model training (e.g., via training engine 182 of FIG. 1) using training set 302. Training of a machine learning model may be achieved in a supervised learning manner, which involves providing a training dataset including labeled inputs through the model, observing its outputs, defining an error (by measuring the difference between the outputs and the label values), and using techniques such as deep gradient descent and back-propagation to tune the weights of the model such that the error is minimized. In many applications, repeating this process across the many labeled inputs in the training dataset yields a model that can produce correct output when presented with inputs that are different than the ones present in the training dataset. In some embodiments, training of a machine learning model may be achieved in an unsupervised manner, e.g., labels or classifications may not be supplied during training. An unsupervised model may be configured to perform anomaly detection, result clustering, etc.

For each training data item in the training dataset, the training data item may be input into the model (e.g., into the machine learning model). The model may then process the input training data item (e.g., an indication of one or more products detected in connection with a content item, and associated confidence values, etc.) to generate an output. The output may include, for example, a list of products that may be associated with the content item and corresponding confidence values. The output may be compared to a label of the training data item (e.g., a human-labeled set of products associated with the content item).

Processing logic may then compare the generated output (e.g., predicted product/content item associations) to the label (e.g., a human-generated list of product/content item associations) that was included in the training data item. Processing logic determines an error (i.e., a classification error) based on the differences between the output and the label(s). Processing logic adjusts one or more weights and/or values of the model based on the error.

In the case of training a neural network, an error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

System 300A may train multiple models using multiple sets of features of the training set 302 (e.g., a first set of features of the training set 302, a second set of features of the training set 302, etc.). For example, system 300A may train a model to generate a first trained model using the first set of features in the training set (e.g., a subset of training data 364, such as data associated with only a subset of models configured to generate product/content item associations, etc.) and to generate a second trained model using the second set of features in the training set. In some embodiments, the first trained model and the second trained model may be combined to generate a third trained model (e.g., which may be a better than the first or the second trained model on its own). In some embodiments, sets of features used in comparing models may overlap (e.g., first set of features being products based on content item title, description, and some images, and second set of features products detected based on content item description, a different set of images of the content item, and detected context (e.g., type of products associated with a content item) of the content item). In some embodiments, hundreds of models may be generated including models with various permutations of features and combinations of models.

At block 314, system 300A performs model validation (e.g., via validation engine 184 of FIG. 1) using the validation set 304. The system 300A may validate each of the trained models using a corresponding set of features of the validation set 304. For example, system 300A may validate the first trained model using the first set of features in the validation set and the second trained model using the second set of features in the validation set. In some embodiments, system 300A may validate hundreds of models (e.g., models with various permutations of features, combinations of models, etc.) generated at block 312. At block 314, system 300A may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300A performs model training using different sets of features of the training set, an updated or expanded training set provided by a data set generator, or the like. Responsive to determining that one or more of the trained models has an accuracy that meets a threshold accuracy, flow continues to block 316. System 300A may discard the trained models that have an accuracy that is below the threshold accuracy (e.g., based on the validation set).

At block 316, system 300A performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300A performs model training using further refined training sets corresponding to further refined sets of features for determining a trained model that has the highest accuracy.

At block 318, system 300A performs model testing (e.g., via testing engine 186 of FIG. 1) using testing set 306 to test selected model 308. System 300A may test, using the first set of features in the testing set, the first trained model to determine the first trained model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where system 300A performs model training (e.g., retraining) using different training sets corresponding to different sets of features, different content items, or the like. Responsive to determining that selected model 308 has an accuracy that meets a threshold accuracy based on testing set 306, flow continues to block 320. In at least block 312, the model may learn patterns in the training data to make predictions, and in block 318, the system 300A may apply the model on the remaining data (e.g., testing set 306) to test the predictions.

At block 320, system 300A uses the trained model (e.g., selected model 308) to receive current data 322 (e.g., newly uploaded content items, newly created content items, content items not included in training, testing, or validating sets of selected model 308, etc.) and determines (e.g., extracts), from the output of the trained model, output data 324 (e.g., product/content item associations and corresponding confidence values). A corrective action associated with the content item and/or associated data may be performed in view of output data 324. For example, instructions may be updated to include presenting a UI element along with a content item specifying that the content item includes one or more associated products, instructions may be updated to include presenting a UI element along with the content item containing additional information about associated products, etc. The instructions may be dependent upon additional factors, e.g., user preferences, presentation environment, of the content item (e.g., a search page, a home page, etc.), or the like. In some embodiments, current data 322 may correspond to the same types of features in the historical data used to train the machine learning model. In some embodiments, current data 322 corresponds to a subset of the types of features in historical data that are used to train selected model 308 (e.g., a machine learning model may be trained using products associations and/or context information and confidence values from several sources, such as text- and image-based sources, and be provided a subset of this data as current data 322).

In some embodiments, performance of the machine learning model (e.g., selected model 308) may be adjusted, improved, and/or updated over time. For example, additional training data may be provided to the model to improve the model's ability to correctly classify products associations with a content item. In some embodiments, some portion of current data 322 may be provided to retrain the model (e.g., via training engine 182 of FIG. 1). The portion of current data 322 may be labeled (e.g., human-labeled), and the labels may be provided to retrain the model (e.g., as current target output data 346). Current data 322 and current target output data 346 may be utilized to periodically, continuously, etc., update and/or improve selected model 308.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

System 300A has been described with respect to a fusion model. The fusion model accepts one or more indications of products detected in association with a content item (e.g., from text associated with the content item, from images associated with the content item, etc.) and confidence values (e.g., confidence that a product is indeed referenced in the content item), and generate as output an overall likelihood that a product is referenced in the content item based on the multiple inputs. Systems similar to system 300A may be utilized to perform other machine-learning based tasks, e.g., the text- or image-parsing models, the output of which are provided as input to the fusion model, may be operated in a similar way as described in connection with system 300A, with appropriate substitutions of input data, output data, etc.

Figure 3B:
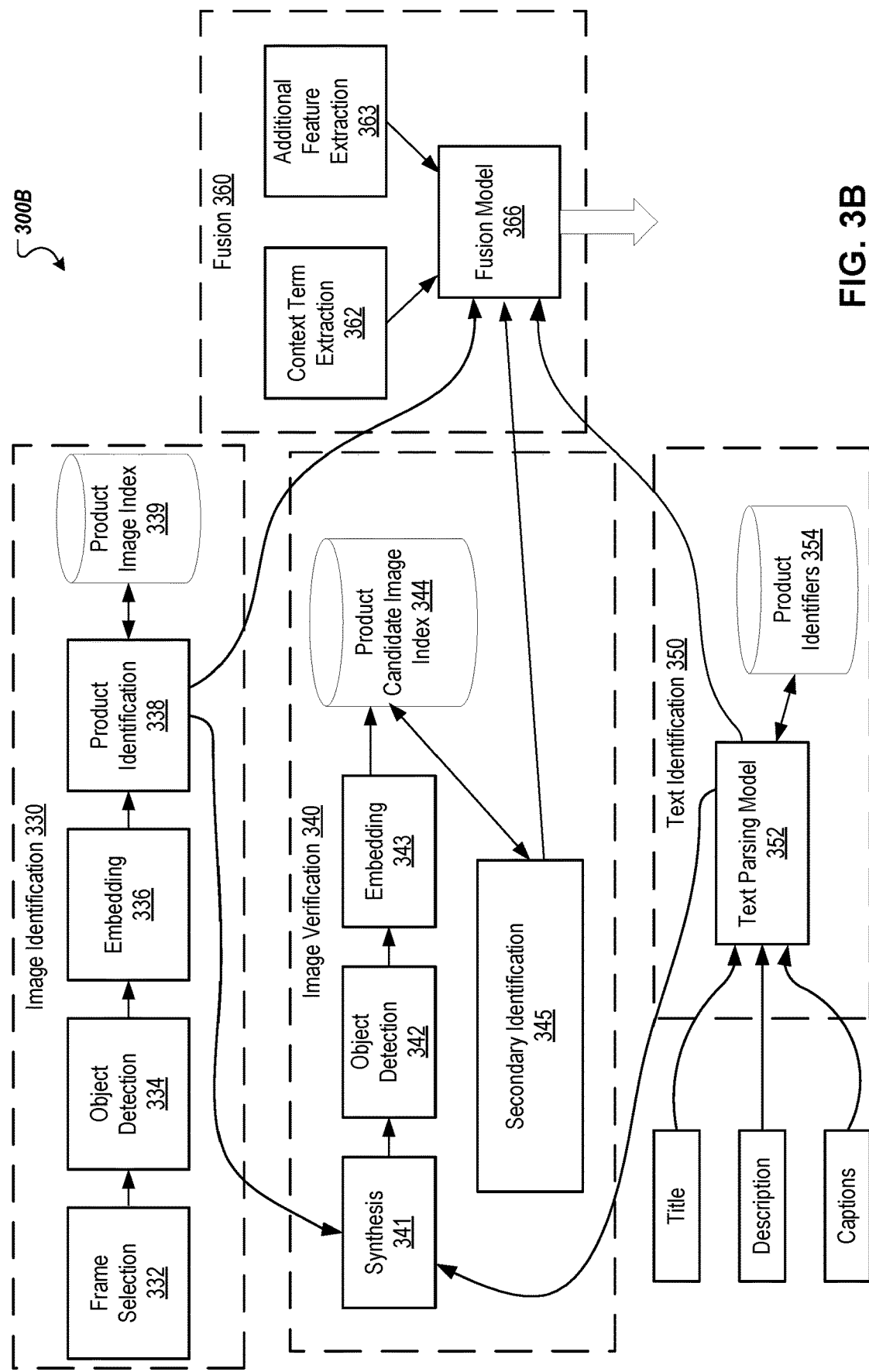
FIG. 3B is a block diagram of an example system for generating data describing associations between a content item and one or more products, according to some embodiments.

FIG. 3B is a block diagram of an example system 300B for generating associations between a content item and one or more products, according to some embodiments. System 300B may include multiple modules, e.g., image identification 330, image verification 340, text identification 350, fusion 360, etc. In some embodiments, multiple modules of system 300B may be operated together to identify products from content items. For example, products detected in images of a content item and metadata of a content item (e.g., title, description, captions, etc.) may be provided to a fusion model do determine, based on the multiple input channels, a likelihood one or more products is associated with the content item. Action may be taken (e.g., updating the metadata of the content item to include an indication of the product) responsive to the likelihood a product appears in the content item, as determined by the fusion model.

Image identification module 330 may be utilized to identify one or more products from images associated with a model, e.g., images from a content item may be compared to images in a database of products (e.g., many thousands of products) to identify products present in a video. Products present may include specific subjects of the content item (e.g., products reviewed in the content item), products included in the content item (e.g., products that appear incidentally, products that appear without being specifically highlighted, etc.), or the like. Text identification module 350 may identify one or more products associated with a content item from metadata/text data associated with the content item, e.g., from text comprising a title of the content item, a description of the content item, captions associated with the content item, etc. Image verification module 340 may use one or more images to verify products identified in a content item. For example, image verification module 340 may work similarly to image identification module 330, but may be used to confirm the presence of one or more products identified by a separate module (e.g., by comparing images of potential products to a more limited range of product images, provided by another module). Fusion module 360 may receive candidate product included in a content item and associated confidence values, and determine based on the various inputs the likelihood that one or more products appear in the content item.

Image identification 330 may be utilized to determine products associated with a content item with a visual component, e.g., a video. Image identification 330 may include frame selection 332. Frame selection 332 may be utilized to choose one or more frames of a video to search for images of products. Frame selection 332 may occur via random samplings, periodic sampling, intelligent sampling methods, etc. For example, a content item (e.g., video) may be provided to a machine learning model, and the machine learning model may be trained to predict frames of a video likely to include one or more products.

One or more frames may be provided to object detection model 334. Object detection 334 may extract from one or more frames predicted object. For example, object detection 334 may isolate potential products from people, animals, background, etc., of image data of a content item. Object detection 334 may be or include a machine learning model.

Images of detected objects may be supplied to embedding 336. Embedding 336 may include converting one or more images to lower dimensionality. Embedding 336 may include providing one or more images to a dimensionality reduction model. The dimensionality reduction model may be a machine learning model. The dimensionality reduction model may be configured to reduce dimensionality of similar images in a similar way. For example, embedding 336 may receive as input an image, and generate as output a vector of values. Embedding 336 may be configured, trained, etc., such that similar images (e.g., images of the same or similar products) are represented similarly (e.g., by Cartesian distance, by cosine distance, by another distance metric, etc.) in the reduced dimensionality vector space. Embedding 336 may generate dimensionally reduced data.

Reduced dimensionality image data may be provided to product identification 338. Product identification 338 may identify one or more products associated with the reduced dimensionality representations provided by embedding 336. Product identification 338 may compare reduced dimensionality image data (e.g., provided by embedding 336) to reduced dimensionality image data (e.g., generated from images of products by the same machine learning model as used by embedding 336) of products included in product image index 339. Product image index 339 may be stored as part of a data store. Product image index 339 may include, for example, many products (e.g., hundreds of products, thousands of products, or more). Product image index 339 may include associations between stored image data (e.g., reduced dimensionality image data) and product identifiers, product indicators, etc. Product image index 339 may be segmented, e.g., dimensionally reduced data stored may be classified into one or more categories, classes, etc. For example, product identification 338 may compare data received from embedding 336 to products of a particular category, type, classification, etc. In some embodiments, the category, type, classification, etc., may be provided by one or more users, one or more content creators, may be automatically detected (e.g., by one or more machine learning models), or the like. A content item or one or more products associated with a content item may be associated with a category (e.g., general category such as electronics, more limited category such as screen devices, a classification of product such as tablets, make or brand, model, or the like). Product identification 338 may generate one or more indications of products detected in images of the content item (e.g., a list of products that may match products represented in product image index 339) and one or more indications of confidence values (e.g., a confidence that each of the list of products was accurately detected). Output of image identification 330 may be utilized to update metadata of a content item (e.g., to include associations with one or more products, to include one or more product identifiers or indicators, etc.). Output of image identification 330 may be provided to image verification 340, e.g., to verify the presence in the content item of images identified by image identification 330. Output of image identification 330 may be provided to fusion 360, e.g., to generate via fusion model 366 a holistic and/or multi-input determination of products included in the content item. Output of image identification 330 may be provided to text identification 350 (not shown), e.g., to limit the space of products queried, searched, compared, etc., by text identification module 350. In some embodiments, image identification 330 is utilized to identify products found in one or more frames of a video content item. For example, image identification module 330 may be configured to generate a list of all products detected in any selected frame, and provide confidence values for each product in each frame selected. Image identification module 330 may generate image-based product data, e.g., one or more identifiers of products, the products identified based on images of a content item.

Image verification module 340 may be configured to verify the presence of identified products of a content item using one or more images of the content item. For example, image verification module 340 may include models configured to confirm the presence of products identified by other models. Image verification module 340 may include secondary identification 345. Secondary identification 345 may include similar components as image identification 330. In some embodiments, image identification module 330 may communicate directly with product candidate image index 344, instead or in addition to secondary identification 345 communicating with product candidate image index 344. In some embodiments, secondary identification 345 may perform similar roles to image identification 330, but may include different models, models trained using different training data, models configured to select different frames or detect different objects, etc.

Image verification 340 may include synthesis model 341. Synthesis model 341 may receive indications of products identified by image identification module 330, text identification module 350, secondary identification 345 (data flow not shown), etc. Synthesis model 341 may select an object detection model 342 to provide data to (e.g., an object detection model configured specifically for a category or classification of products). Synthesis model 341 may include image selection, e.g., synthesis model 341 may provide one or more images to object detection 342, may select one or more frames to provide to object detection 334, etc. For example, synthesis model 341 may provide one or more frames likely to include a product, based on data received from image identification 330 and text identification 350, to object detection 342. Object detection model 342 may perform similar functions to object detection model 334, e.g., modified by the function of synthesis model 341. Embedding 343 may perform functions similar to embedding 336, e.g., to reduce dimensionality of images of detected products. In some embodiments, product candidate image index 344 may include reduced dimensional image data (e.g., vectors of values) detected by other modules (e.g., image identification 330, text identification 350, etc.). Secondary identification 345 may compare reduced dimensionality image data (e.g., embedded image data) to candidate data of product candidate image index 344 (e.g., products identified by a module other than image verification module 340) to verify the presence of products in a content item.

Text identification 350 may be configured to identify one or more products from text data (e.g., metadata) associated with a content item. Text identification 350 may generate metadata-based product data, e.g., one or more product identifiers based on metadata of a content item. Text identification 350 may generate text-based product data, e.g., one or more product identifiers based on text data associated with a content item. Text identification 350 may identify products from one or more of a content item title, a content item description, captions associated with a content item (e.g., machine-generated captions), comments associated with the content item, and/or other text data or metadata of the content item. Text data (e.g., metadata) associated with a content item may be provided to text parsing model 352. Text parsing model 352 may be a machine learning model. Text parsing model 352 may be configured to detect or predict products from text data associated with a content item. Text parsing model 352 may be configured to detect one or more products with product identifiers stored in product identifiers 354. Text parsing model 352 may provide output (e.g., a list of candidate products detected, associated confidence values, etc.) to image verification module 340. Text parsing model 352 may provide output so synthesis model 341. Text parsing model 352 may provide output that affects products of image verification, e.g., output of text parsing model 352 may cause products detected by text identification module 350 to be added to product candidate image index 344. Image verification module 340 may query an index (e.g., product candidate image index 344) which includes products detected by other modules, e.g., image identification module 330, text identification module 350, etc.

Fusion module 360 may receive output data (e.g., detected products, associated confidence values) from one or more sources (e.g., image identification module 330, image verification module 340, text identification module 350, etc.). Fusion module 360 may further receive data from other sources, e.g., context term extraction 362, or additional feature extraction 363. Context term extraction 362 may, for example, provide context to potential products of a content item, e.g., may detect categories or subjects associated with some products. Context term extraction 362 may be performed by one or more machine learning models. Context term extraction 362 may detect contextual information from text associated with a content item, metadata associated with a content item, etc. Additional feature extraction 363 may provide additional details that may be used to determine if one or more products appears in a content item. Additional features may include video embeddings. Additional features may include other metadata of the content item, e.g., the date the content item was uploaded to a content providing platform (e.g., compared to a release date of a product), classification of the content item (e.g., a shopping or product review video may be more likely to include products than another type of video), etc.

Data from multiple sources may be provided to fusion model 366. Fusion model 366 may be configured to receive data, e.g., including one or more products with confidence values, and determine one or more products with confidence values indicating a likelihood that the products appear in a content item. In some embodiments, the content item may be a video. In some embodiments, the content item may be a live-streamed feed, e.g., a live streamed video feed (e.g., a product review stream, an unboxing stream, etc.). The content item may be a short-form video.

FIGS. 4A-E depict example UIs presented on a user device, including UI elements indicative of associated products, according to some embodiments. FIGS. 4A-E may include UIs provided as part of applications of devices 400A-E, e.g., web browser applications, mobile applications associated with/provided by a content platform, etc. User interaction with various elements of UIs of FIGS. 4A-E may cause changes to the UI elements presented. For example, interaction with a UI element indicating that a content item has associated products may cause a second UI element to be displayed (e.g., replacing the first UI element, expanding the first UI element, etc.) presenting additional information (e.g., about the associated products). A UI element may include an element which, when interacted with, causes the UI to display less information about associated products (e.g., collapse a panel describing one or more associated products). Interacting with a UI element associated with one or more products may cause different effects, e.g., a transition to a UI environment for presenting a content item. The new UI environment may include one or more UI elements associated with one or more products of the content item. Interacting with a UI element associated with a product may cause display of a UI element facilitating a transaction (e.g., purchase) of the product. Various interactions between the UIs and UI elements presented in FIGS. 4A-E are possible (e.g., interacting with an element of a first UI layout may cause a transition to a second UI layout), and any transition between sample UIs, similar UIs, inclusion of similar UI elements, etc., are within the scope of this disclosure. FIGS. 4A-E are described in connection with video content items, other types of content items (e.g., image content, text content, audio content, etc.) may be presented in similar UIs. Any optional features, elements, etc., presented in relation to one or more of FIGS. 4A-E may be included in systems similar to another of these figures, as appropriate.

Figure 4B:
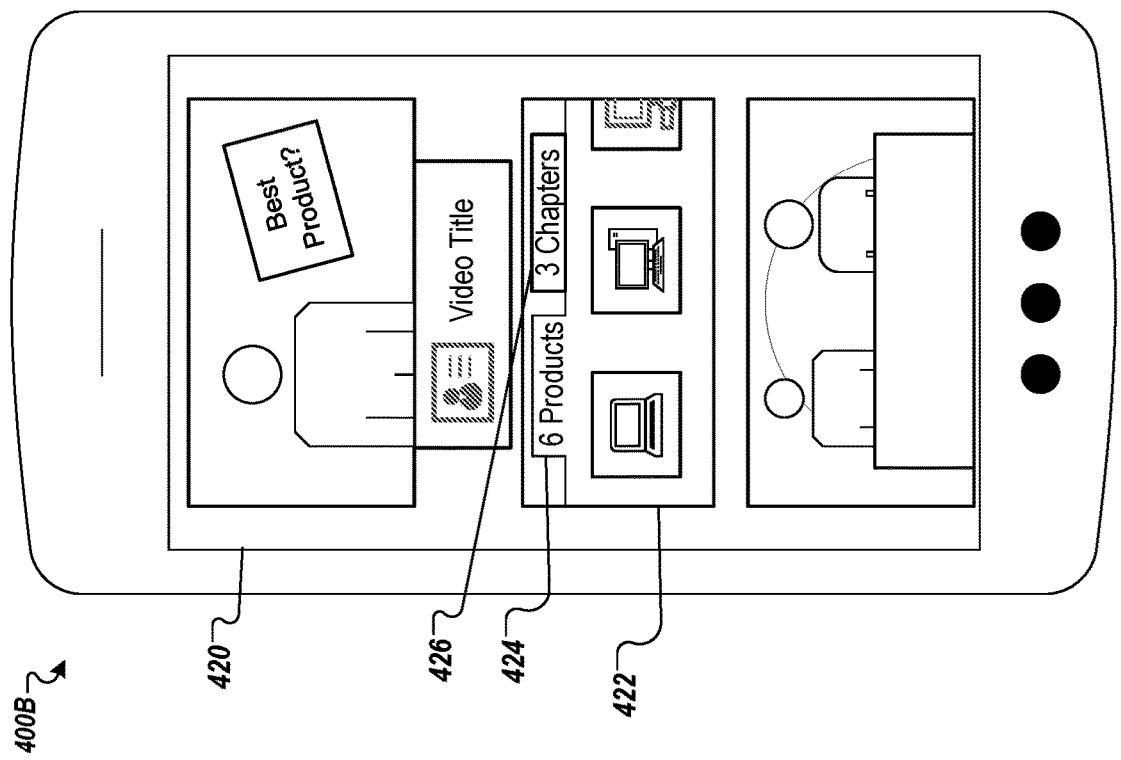
FIG. 4B depicts a device presenting an example UI including a UI element indicating products associated with a content item, according to some embodiments.
Figure 4A:
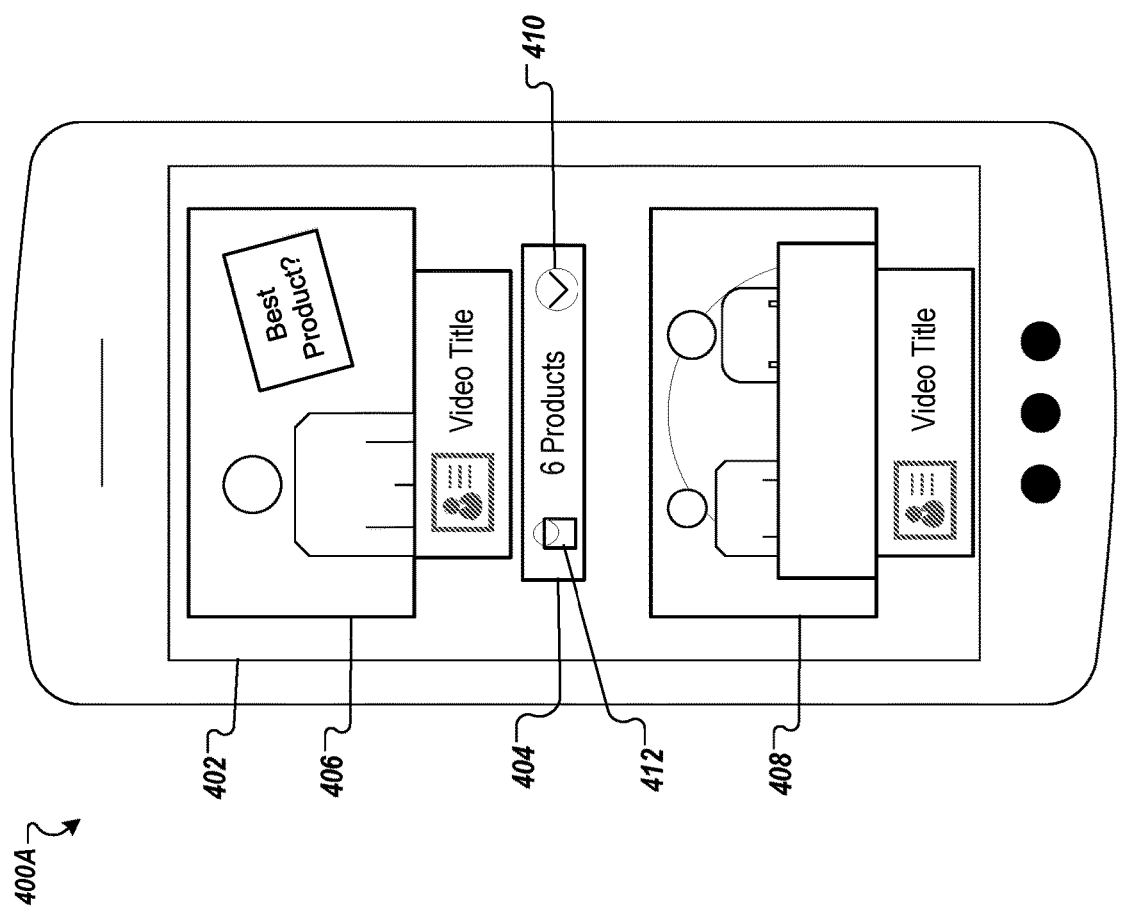
FIG. 4A depicts a device presenting an example user interface (UI) including a UI element indicating products associated with a content item, according to some embodiments.

FIG. 4A depicts a device 400A presenting an example UI 402 including a UI element 404 indicating one or more associated products, according to some embodiments. A UI including elements of UI 402 and/or similar UI elements may be presented by device 400A as a part of operations to present one or more content items for user selection. UI element 404 is depicted in FIG. 4A in a collapsed state, e.g., a collapsed default state.

UI 402 includes first content item selector 406 (e.g., a video thumbnail) and second content item selector 408. In some embodiments, more or fewer content items may be selectable, UI 402 may be scrolled to view additional content items, etc. UI element 404 is associated with the content item indicated by content item selector 406. UI element 404 (and other UI elements of FIGS. 4A-D related to products) may be presented above, next to, overlapping with, within, below, etc., a content item or content item selector for a content item associated with UI element 404.

In some embodiments, product information (e.g., product/content item associations) may be provided by the content creator. Product information may be provided by one or more users. Product information may be provided by an administrator. Product information may be retrieved from a content item, e.g., via one or more machine learning models, via a system such as system 300B, or the like.

In some embodiments, a user may interact with UI element 404 to be presented with a replaced UI element, an updated UI element, etc. For example, a user may interact with expansion element 410 to display more information about products associated with a content item. In some embodiments, expanding UI element 404 may open a panel including additional information about one or more products associated with a content item. Expanding UI element 404, interacting with UI element 404, etc., may adjust presentation of UI 402, e.g., to include elements depicted in FIGS. 4B-D.

UI element 404 may include, for example, expansion element 410, an indication of associated products (e.g., how many products are associated with a content item), a visual indication of products 412 (e.g., a visual indication that a transaction or purchase is available, that a link to a merchant for a product is available, etc.), or the like. User interaction with one or more components of UI element 404 may cause device 400A to modify a presentation of UI element 404, e.g., user selection of expansion element 410 may cause presentation of UI element 404 to be modified to an expanded state.

A UI including UI element 404 may be presented in response to device 400A sending a request for content items to a content providing platform (e.g., content providing platform 120 of FIG. 1). UI element 404 may be presented in a home feed (e.g., a list of suggested content items for a user or user account). UI element 404 may be presented in a suggested feed (e.g., a list of suggested content items based on one or more recently presented content items). UI element 404 may be presented as part of a playlist (e.g., a user-populated, creator-populated, etc., list of content items to be presented). UI element 404 may be presented in a search feed (e.g., responsive to a user-generated search query sent by device 400A to a content providing platform). For example, a UI element associated with one or more products may be presented based on the inclusion of a product, product category, product brand, etc., included in a search query. UI element 404 may be presented in a product-focused feed (e.g., a shopping content feed). UI element 404 may be responsive to a user selection of a content item, e.g., may be displayed upon user selection to watch an associated video, be presented with an associated content item, etc. UI element 404 may be presented based on a user's detected interest in a content item. For example, a user may dwell on a thumbnail for a video (e.g., a user may rest a cursor on the thumbnail, a user may pause scrolling with the thumbnail presented, etc.). Upon a dwell meeting one or more conditions (e.g., duration condition, location of the thumbnail condition, etc.), UI element 404 may be presented. UI element 404 may be presented responsive to additional data, e.g., user account history, user settings, user preferences, etc. UI element 404 may be presented along with a list of content items to be presented, UI element 404 may be presented while presenting a content item (e.g., while playing a video associated with products of UI element 404), etc.

FIG. 4B depicts a device 400B presenting an example UI 420 including a UI element 422 indicating associated products, according to some embodiments. UI element 422 includes information about one or more products associated with a content item. UI element 422 is presented in FIG. 4B in an expanded state. UI element 422 may include a number of components. For example, a first component may include information about a first product (e.g., a picture, product name, price, timestamp, etc.), a second component may include information about a second product, etc. In some embodiments, UI element 422 may be scrollable, e.g., to access information about additional products. UI element 422 may include multiple tabs (e.g., UI element 422 may be associated with product information and one or more other types of information). For example, UI element 422 may include products tab 424 and chapters tab 426. In some embodiments, product tab 424 may be opened by default (e.g., contents of product tab 424 may be presented by default). In some embodiments, chapter tab 426 may be opened by default (e.g., contents of chapter tab 426 may be presented by default). In some embodiments, another tab may be opened by default. For example, chapter tab 426 may be open by default except for content items with associated products, a tab opened by default may be selected based on user history (e.g., of interacting with elements of chapter tabs, product tabs, etc.), based on a search query (e.g., a search including a product name, a related term or phrase such as "product review," etc.), or the like. UI element 422 may include additional elements, e.g., elements a user may utilize to control presentation of UI 420, UI element 422, etc. For example, UI element 422 may include a "close" element to present UI 420 without UI element 422, may include a "collapse" element to display less information (e.g., to collapse the panel to resemble UI element 404 of FIG. 4A, to modify presentation of UI element 422 to a collapsed state, etc.), one or more elements to display more information (e.g., one or more listed products, listed product icons, etc., may be selected to present additional information about the product, to facilitate purchase of the product, or the like), etc.

Products tab 424 of UI element 422 may include one or more pictures of products, information about products (e.g., name of products, description of products, etc.), a price of one or more products, a time stamp of the content item relevant to the product, etc. In some embodiments, product information may be provided by a content creator, one or more users, a system administrator, or the like. In some embodiments, product information may be retrieved by one or more models, e.g., machine learning models. For example, presence of a product in a content item, association of a product in a content item, a time stamp or location at which a product appears in a content item, or the like may be determined by one or more machine learning models. A system such as system 300B of FIG. 3B may be utilized to determine one or more products associated with a content item (e.g., a video). A portion of the content item (e.g., a time stamp) relevant to a content item may be determined, e.g., via a timing of captions associated with the product, timing of display of an image or frame of a video including the product, or the like. In some embodiments, selecting a product may cause presentation of a portion of a content item associated with the product, may cause presentation of a content item beginning at a time indicated by a timestamp associated with the product, etc.

In some embodiments, the portion (e.g., visual component) of UI element 422 associated with a particular product may be displayed by default, displayed differently (e.g., highlighted), etc. For example, upon receiving a search query from a user including the name of a product, UI element 422 may be displayed, including a display associated with the searched product.

In some embodiments, one or more associations between a content item and products may be stored, e.g., as metadata associated with the content item (metadata associated with a content item may further include content item title, description, presentation history, captions associated with the content item, etc.). Responsive to a device (e.g., device 400B) executing instructions to display a list of content items for presentation, to present a content item to a user, to present a UI element including information about one or more products (e.g., UI element 422), or the like, the device may retrieve information about a product based on the metadata associating the product to a content item. Information about the product (e.g., images, associated products such as color variants, availability, price, etc.) may be retrieved from a data store. The data store may include information about products and may be updated, e.g., as information such as price of a product changes, UIs may retrieve the updated information and display the updated information, based on content item/product associations.

UI element 422 may be presented as part of a home feed (e.g., a list of suggested content items for a user or user account), a suggested feed (e.g., a list of suggested content items based on one or more recently presented content items), a playlist, a list of search results, a shopping content page, etc. UI element 422 may be presented upon selection of a content item for presentation, upon presentation of a content item, etc. UI element 422 may be presented on dwell (e.g., pausing scrolling on a content thumbnail, pausing scrolling on a less detailed element such as UI element 404 of FIG. 4A, etc.). In some embodiments, UI element 422 may be removed or replaced upon user action, e.g., upon scrolling, UI element 422 may collapse to resemble UI element 404 (e.g., to facilitate selection of a content item from the list of content items, to simplify scrolling through a list of content items, etc.). UI element 422 may be displayed while presenting a list of content items, while presenting a single content item (e.g., while playing a video associated with products of UI element 422), etc.

Figure 4D:
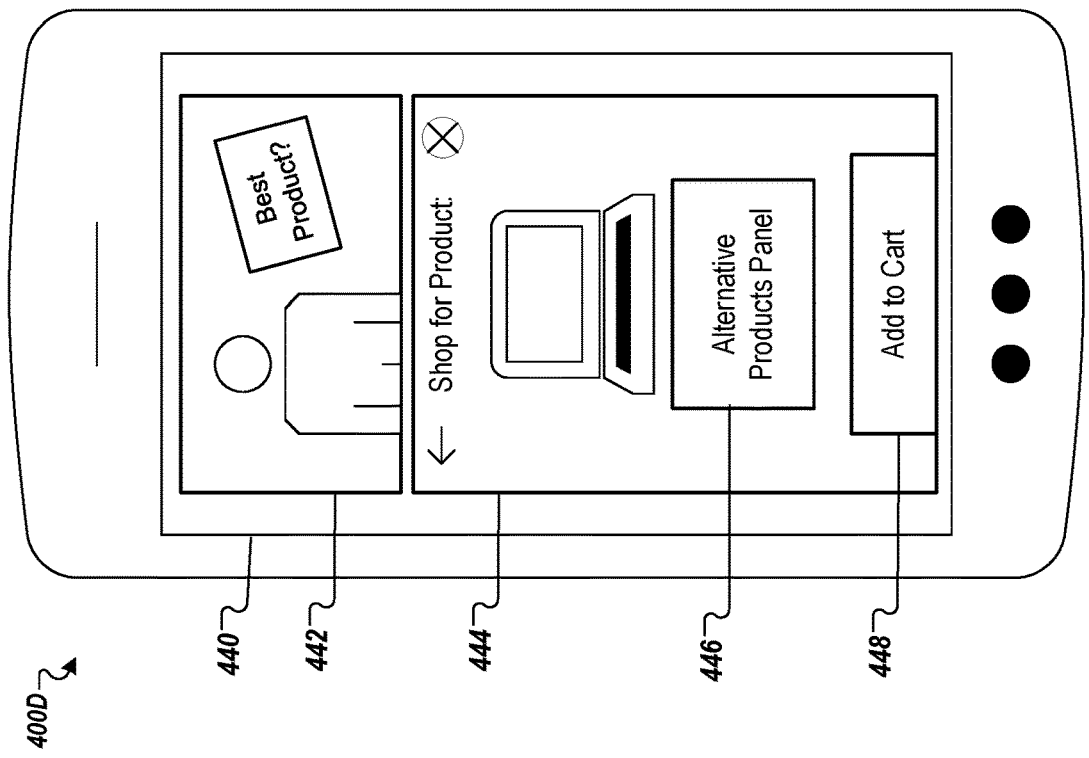
FIG. 4D depicts a device presenting and example UI including a UI element presenting a content item and a UI element facilitating a transaction associated with a product, according to some embodiments.
Figure 4C:
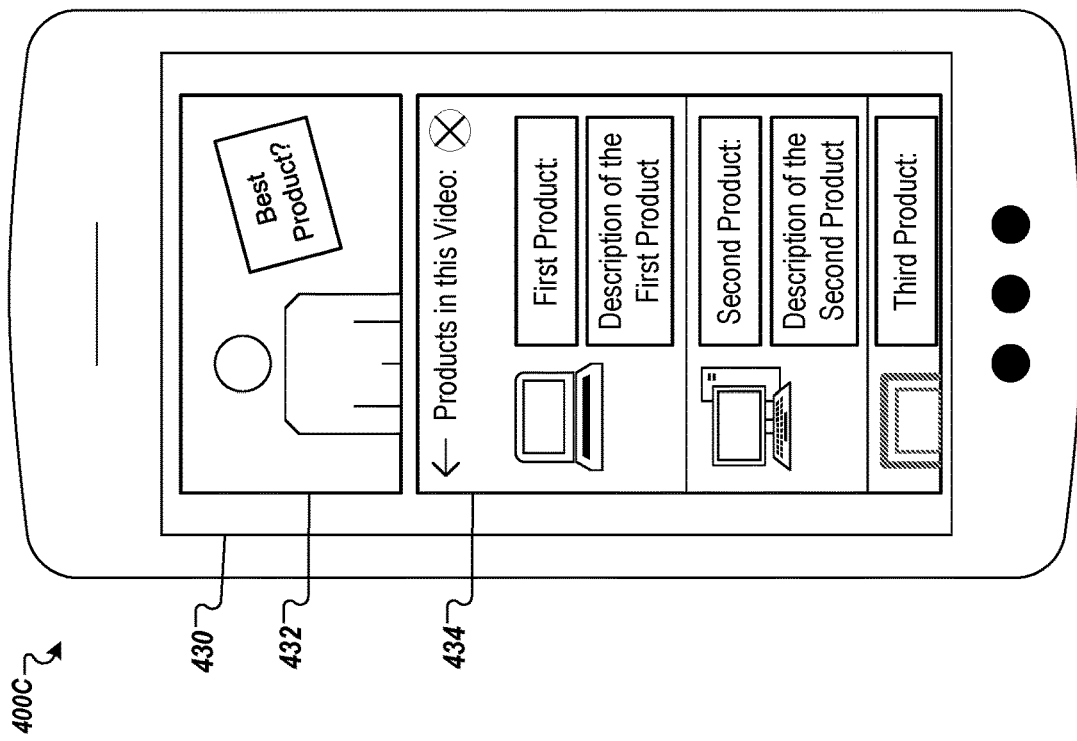
FIG. 4C depicts a device presenting an example UI including a UI element presenting a content item and UI elements presenting information about products associated with the content item, according to some embodiments.

FIG. 4C depicts a device 400C presenting an example UI 430 including a UI element 432 presenting a content item and UI element 434 presenting information about associated products, according to some embodiments. UI element 434 may include more detailed information about products associated with a content item than UI element 422 of FIG. 4B. UI element 434 may be product focused, e.g., may function to display product information to a user. UI element 434 may include one or more components, e.g., a component associated with a first product, a component associated with a second product, etc. In some embodiments, UI element 434 may include a list of products associated with a content item. UI element 434 may be navigable, scrollable, etc. UI element 434 may include one or more control elements, e.g., a back button to return to a previous view, a close button to close UI element 434 and view a different set of UI elements (e.g., not related to products), etc. In some embodiments, UI element 434 may be removed from UI 430 responsive to another user action, e.g., a user scrolling past an associated content item. In some embodiments, user selection of a product presented via UI 434 may prompt presentation of a UI element facilitating purchase of the product. In some embodiments, UI element 434 may be displayed responsive to a determination of user interest in one or more products associated with a content item (e.g., based on user history, based on one or more terms in a user search query, based on a user choosing to browse and/or be presented shopping content items, based on a user selection of a product or a UI element associated with a product, etc.).

UI element 434 may include one or more pictures and/or additional information about one or more products associated with a content item (e.g., the content item presented via UI element 432). The pictures and/or information may be provided by a content creator, one or more users, be retrieved from a database (e.g., based on product/content item association metadata), etc. In some embodiments, UI element 432 may automatically scroll. For example, UI element 432 may scroll as a content item is presented, e.g., such that a product that is associated with a portion of a content item currently being presented is visible. UI element 432 may be presented responsive to user selection of a content item to be presented. UI element 432 may be presented responsive to other factors, e.g., user history. UI element 432 may be presented upon a user dwell on an associated content item, an associated UI element, etc.

In some embodiments, UI element 434 may present information about a single product, e.g., a product selected by a user (e.g., via UI element 422 of FIG. 4B). UI element 434 may be product focused, may be focused on a single product, may display product variations (e.g., as described in connection with UI element 444 of FIG. 4D), or may include other elements, components, and/or information described with respect to other UI elements described herein.

FIG. 4D depicts a device 400D presenting an example UI 440 including a UI element 442 presenting a content item and a UI element 444 facilitating a transaction associated with a product, according to some embodiments. UI element 444 may provide one or more fields associated with a user making a transaction, e.g., purchasing a product. For example, UI element 444 may include alternative products panel 446 may include information, pictures, prices, etc., about alternate products (e.g., products related to one or more products associated with the content item, such as color variations, size variations, variations of bundles of products, related products such as similar products of another brand, etc.).

UI element 444 may include transaction element 448. In some embodiments, transaction element 448 may facilitate a transaction (e.g., purchase) within the application providing UI 440. In some embodiments, transaction element 448 may facilitate a transaction via another application, another website, or the like, e.g., interacting with transaction element 448 may direct a user to a merchant website, may direct device 400D to open an application associated with purchasing the product, etc.

UI element 444 may be navigable, scrollable, etc. UI element 444 may include one or more control elements, e.g., a back button to return to a previous view, a close button to close UI element 444 and display via UI 440 a different set of UI elements, etc. In some embodiments, UI element 444 may be displayed as part of a list of content items for user selection, as part of a UI 440 presenting a content item, etc. UI element 444 may be displayed responsive to a determination of user interest in a transaction (e.g., purchase) associated with one or more products included in a content item, e.g., selection of a product from a UI element such as UI element 434 of FIG. 4C, selection of a content item, dwell on a content item, a product or product-related term included in a search query, navigation by a user to a shopping-focused list of content items, etc. UI element 444 may receive information about one or more products from a database, e.g., based on metadata associating a content item with one or more products.

UI elements depicted in FIGS. 4A-D may be integrated in various configurations. For example, a UI element such as UI element 404 may be presented, upon user interaction with UI element 404 an element such as UI element 422 may be presented, upon user interaction with UI element 422 UI element 434 may be presented, upon user interaction with UI element 434 UI element 444 may be presented, etc. One or more UI elements may include navigation elements for instructing a device to display a different UI element, e.g., interacting with expansion element 410 may cause presentation of a UI element such as UI element 422, and interacting with a different element of UI element 404 may cause presentation of a UI element such as UI element 434, UI element 444, or the like.

Other connections between UI elements are possible, e.g., interacting with a UI element such as UI element 404 may cause display of a UI element such as UI element 422, such as UI element 434, such as UI element 444, etc. Interactions with a UI element such as UI element 422 or a portion thereof may cause presentation with a UI element such as UI element 404, such as UI element 434, such as UI element 444, etc. User interaction with a UI element such as UI element 434 or a portion thereof may cause presentation of a UI element such as UI element 404, UI element 422, such as UI element 444, etc. User interaction with a UI element such as UI element 444 or a portion thereof may cause display of UI element such as UI element 404, such as UI element 434, such as UI element 444, etc. A default UI element presented may depend upon the environment in which the UI element is presented (e.g., a list of content items presented responsive to a search, home feed, shopping feed, watch feed, etc.; an environment including a content item being presented; or the like). For example, selection of the form of a UI element may be based on a number of factors. In some embodiments, inclusion of a product name, category, or the like, in a search query may alter a default UI element, e.g., may cause a UI to demonstrate by default a UI element including information about the product, a UI element including purchasing options for the product, or the like. Determination of the form of a UI element to display may be based on user history, user account history, a user action (e.g., opening of a home feed, presentation of a watch feed, transmission of a search query, selection of a shopping feed, etc.). Transitions between forms of UI elements associated with products may be determined by additional data similar to data used to determine the form of a UI element presented.

Figure 4E:
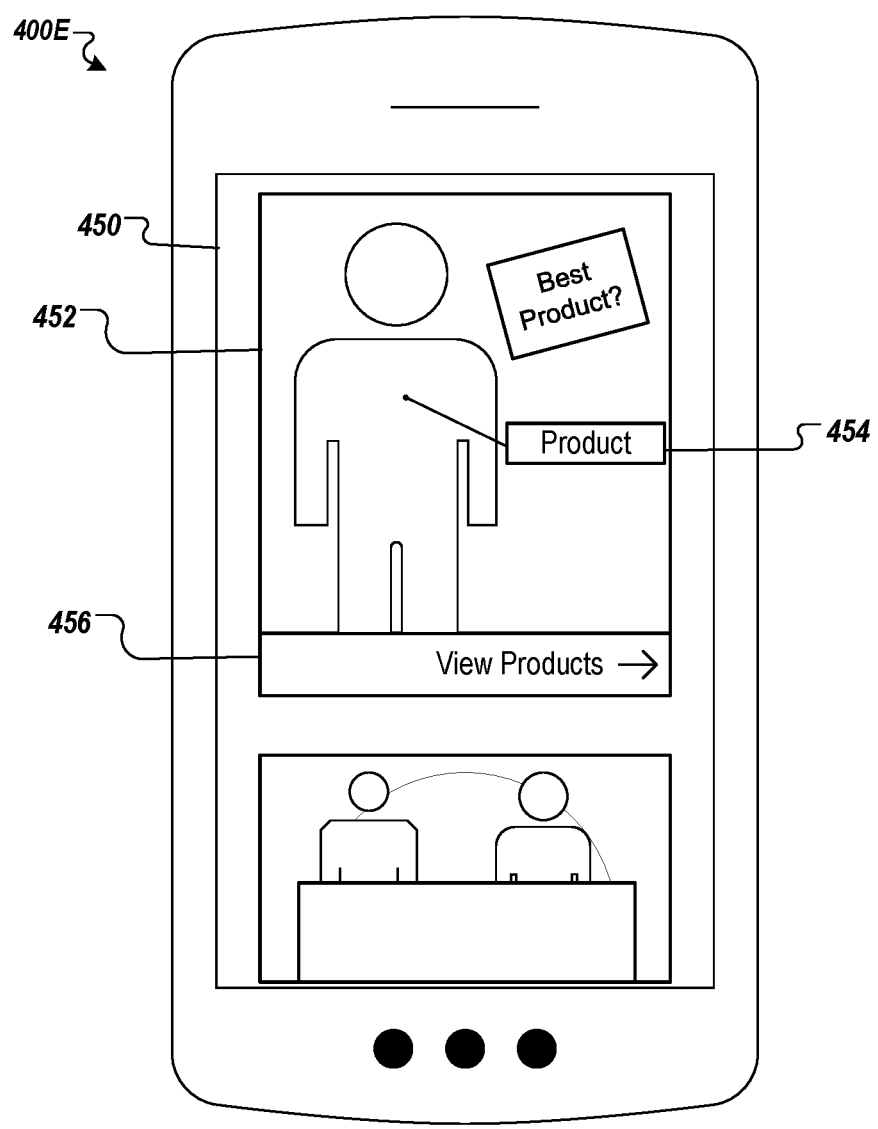
FIG. 4E depicts an example device with UI elements overlaid on a content presentation element, according to some embodiments.

FIG. 4E depicts an example device 400E with UI elements overlaid on content presentation element 452, according to some embodiments. Device 400E includes UI 450. UI 450 may be provided by an application, e.g., an application associated with a content providing platform. Presentation element 452 may present a content item (e.g., a video). UI 450 may present a list of additional content items, additional information associated with a presented content item (e.g., title, description, comments, a live chat, etc.), additional UI elements associated with products (e.g., UI elements such as UI elements 404, 422, 434, 444, or variations), etc.

Presentation element 452 may be overlaid with one or more UI elements. UI element 454 may indicate a product included in a content item (e.g., shown in a video). UI element 454 may perform functions similar to other UI elements of FIGS. 4A-D, e.g., may present information about a product, enable display of further information about the product, facilitate purchasing the product, etc. Placement of overlaid elements may be determined by one or more users, content creators, models (e.g., machine learning models configured to detect products or objects in an image may be utilized to avoid areas of a content item display including objects), etc. UI element 454 may include a visual indicator of where in the content item (e.g., where in a video) one or more related products are located. UI element 454 may be presented during presentation of a content item, e.g., while a video is playing. UI element 454 may be displayed and/or removed responsive to the relevant product's presence in the content item, e.g., may be displayed while the content item is in the video. UI element 454 may indicate multiple products, may identify the products (e.g., may name one or more products), may display information about products, etc. Multiple UI elements such as UI element 454 may be displayed, e.g., on a thumbnail of a video, throughout presentation of a video, simultaneously during a video, etc.

Overlaid UI elements such as UI element 454 may be presented in combination with other UI elements associated with products, e.g., UI element 456 may open a panel including information about multiple products associated with the content item, UI element 454 may cause display of a UI element including information about the pictured product, etc.

Overlaid UI element 454 may be displayed over (e.g., in front of, have visual priority over, etc.) a visual representation of a content item. For example, UI element 454 may be overlaid on a video thumbnail. UI element 454 may be displayed over a content item. For example, UI element 454 may be overlaid on a video that is playing. Presentation of UI element 454 may be performed responsive to user actions. For example, upon determining that a user is interested in one or more products (e.g., via a search query, via interaction with product-related UI elements, via user history, etc.) UI element 454 may be displayed overlaid on another UI element. In some embodiments, the content item may be a live-streamed video. In some embodiments, the content item may be a short-form video.

In some embodiments, UI element 454 may perform similarly to descriptions of performance of UI element 404, e.g., may inform a user that one or more products are associated with a content item. UI element 454 may respond to interaction from a user similarly to UI element 404, e.g., may open or expand a panel including product information, may modify presentation of UI element 404 to display more or different information, may expand the UI element to include more information, may initiate presentation of the content item, etc. UI element 454 may respond to interaction from a user similarly to UI element 434, e.g., may open or expand a panel facilitating a transaction.

FIGS. 5A-F are flow diagrams of methods 500A-F related to content items with associated products, according to some embodiments. Methods 500A-F may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 500A-F may be performed, in part, by content platform system 102, product identification system 175, and/or client device 110 of FIG. 1. Method 500A may be performed, in part, by product identification system 175 (e.g., server machine 170 and data set generator 172 of FIG. 1, data set generator 272 of FIG. 2). Product identification system 175 may use method 500A to generate a data set to at least one of train, validate, or test a machine learning model, in accordance with embodiments of the disclosure. Methods 500B-D may be performed by product identification system 175 (e.g., system 300B of FIG. 3B) and/or server machine 180 (e.g., training, validating, and testing operations may be performed by server machine 180). Method 500E may be performed by client device 110.

Method 500E may be utilized by client device 110 to display one or more UI elements associated with products, e.g., facilitating user identification of products included in content items. Method 500F may be performed by content platform system 102, e.g., may be performed by processing logic of content providing platform 120 to facilitate presentation of one or more UI elements associated with products by client device 110. In some embodiments, a non-transitory machine-readable storage medium stores instructions that when executed by a processing device (e.g., of product identification system 175, of server machine 180, etc.) cause the processing device to perform one or more of methods 500A-F.

For simplicity of explanation, methods 500A-F are depicted and described as a series of operations. However, operations in accordance with this disclosure can occur in various orders and/or concurrently and with other operations not presented and described herein. Furthermore, not all illustrated operations may be performed to implement methods 500A-F in accordance with the disclosed subject matter. In addition, those skilled in the art will understand and appreciate that methods 500A-F could alternatively be represented as a series of interrelated states via a state diagram or events.

Figure 5A:
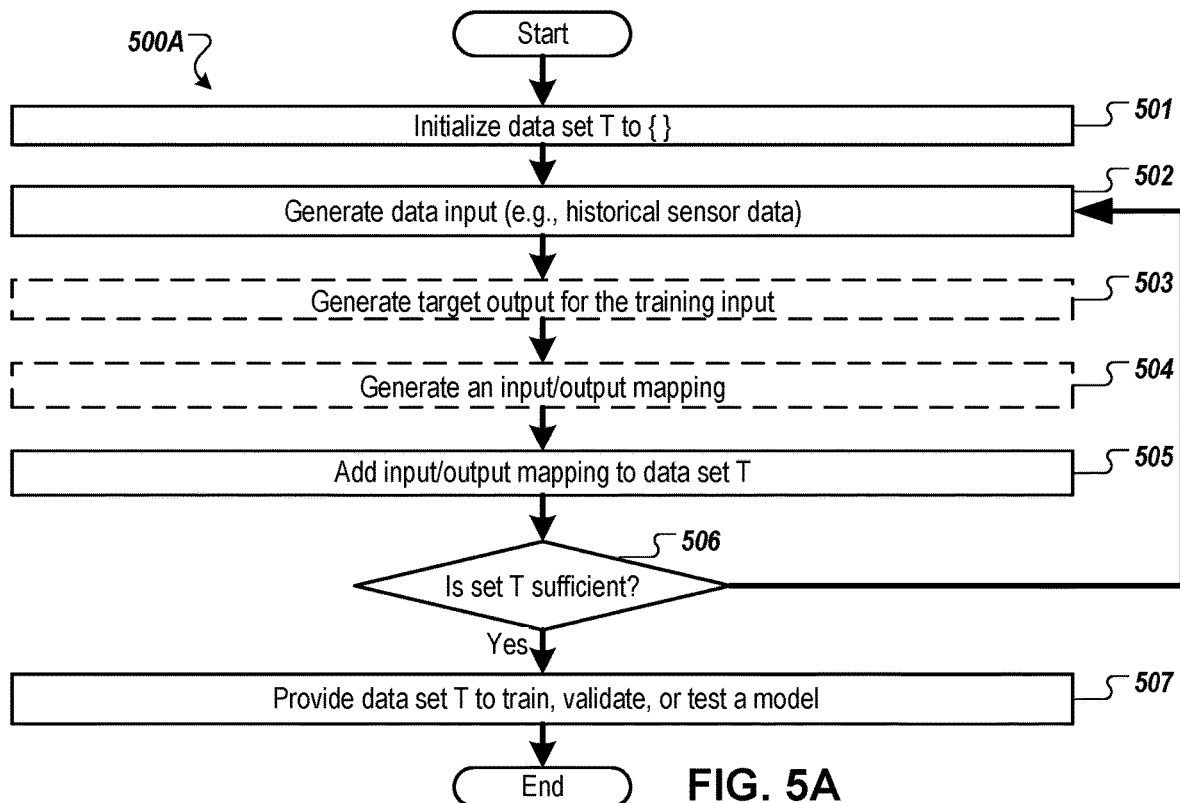
FIG. 5A is a flow diagram of a method for generating a data set for a machine learning model, according to some embodiments.

FIG. 5A is a flow diagram of a method 500A for generating a data set for a machine learning model, according to some embodiments. Referring to FIG. 5A, in some embodiments, at block 401 the processing logic implementing method 500A initializes a training set T to an empty set.

At block 502, processing logic generates first data input (e.g., first training input, first validating input) that may include one or more of product data, image data, metadata, text data, confidence data, etc. In some embodiments, the first data input may include a first set of features for types of data and a second data input may include a second set of features for types of data (e.g., as described with respect to FIG. 3A). Input data may include historical data in some embodiments.

In some embodiments, at block 503, processing logic optionally generates a first target output for one or more of the data inputs (e.g., first data input). In some embodiments, the input includes one or more predicted products and associated confidence intervals detected in a content item, and the target output may include labels of products included in the content item. In some embodiments, the input includes one or more sets of data associated with a content item (e.g., image data such as frames of a video or portions of frames of a video, metadata such as title text or captions text, etc.) and the target output is a list of products included in the content item. In some embodiments, the first target output is predictive data. In some embodiments, input data may be in the form of caption text data and target output may be a list of possible corrections to captions to include product names/references, for a machine learning model configured to correct captions by including product information. In some embodiments, no target output is generated (e.g., an unsupervised machine learning model capable of grouping or finding correlations in input data, rather than requiring target output to be provided).

At block 504, processing logic optionally generates mapping data that is indicative of an input/output mapping. The input/output mapping (or mapping data) may refer to the data input (e.g., one or more of the data inputs described herein), the target output for the data input, and an association between the data input(s) and the target output. In some embodiments, such as in association with machine learning models where no target output is provided, block 504 may not be executed.

At block 505, processing logic adds the mapping data generated at block 504 to data set T, in some embodiments.

At block 506, processing logic branches based on whether data set T is sufficient for at least one of training, validating, and/or testing a machine learning model, such as one of models 190 of FIG. 1. If so, execution proceeds to block 507, otherwise, execution continues back at block 502. It should be noted that in some embodiments, the sufficiency of data set T may be determined based simply on the number of inputs, mapped in some embodiments to outputs, in the data set, while in some other embodiments, the sufficiency of data set T may be determined based on one or more other criteria (e.g., a measure of diversity of the data examples, accuracy, etc.) in addition to, or instead of, the number of inputs.

At block 507, processing logic provides data set T (e.g., to server machine 180 of FIG. 1) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210) are input to the neural network, and output values (e.g., numerical values associated with target outputs 220) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 507, a model (e.g., model 190) can be at least one of trained using training engine 182 of server machine 180, validated using validating engine 184 of server machine 180, or tested using testing engine 186 of server machine 180. The trained model may be implemented by product identification system 175 to generate output data, e.g., to be used by product information platform 161 to provide product data to a user, to be provided to a fusion model, to be utilized to update metadata of a content item to include one or more product associations, etc.

Figure 5B:
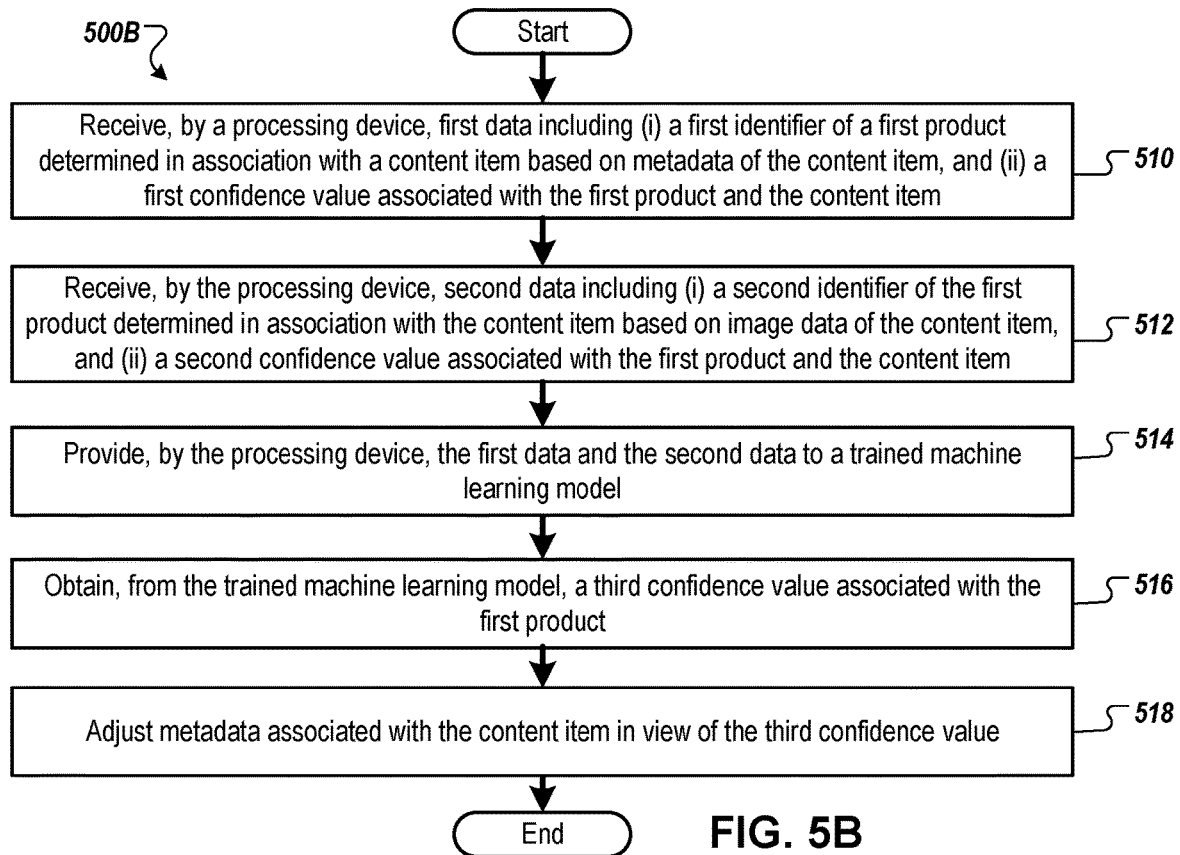
FIG. 5B is a flow diagram of a method for updating metadata of a content item, according to some embodiments.

FIG. 5B is a flow diagram of a method 500B for updating metadata of a content item, according to some embodiments. At block 510, processing logic (e.g., a processing device, a computer processor, etc.) receives first data. The first data includes a first identifier (e.g., indicator, a pointer to further data, a code identifying a product, etc.) of a first product determined in association with a content item based on metadata of the content item. The content item may be or include visual content, audio content, text content, video content, etc. The first product may have been determined by providing metadata of the content item to one or more trained machine learning models (e.g., text identification module 350 of FIG. 3B). The metadata may include text data, e.g., content item title, description, captions, comments, live chat, etc. The first data may further include a first confidence value associated with the first product and the content item. The first confidence value may indicate a likelihood that the first product is associated with the first content item, e.g., that the first product appears or is referenced in the metadata of the content item. The first data may further include an identifier of a second product, and a second confidence value associated with the second product. The first data may include a list of products and associated confidence values.

At block 512, processing logic receives second data including a second identifier of the first product. The second identifier was determined in associated with the content item based on image data of the content item (e.g., one or more frames of a video, portions of one or more images, etc.). The second data also includes a second confidence value associated with the first product and the content item. The confidence value and the identifier may be generated by one or more machine learning models (e.g., image identification module 330 of FIG. 3B). The machine learning models may include systems configured to reduce dimensionality of image data. One or more candidate product images may be dimensionally reduced (e.g., the image converted via a trained machine learning model to a vector of values). The machine learning models may perform operations including comparing reduced dimensionality image data from the content item to dimensionally reduced product images of a data store, e.g., to determine a likelihood that an image includes a product. The second data may include a list of products (e.g., product identifiers) and a list of confidence values, including at least the first product. The confidence values may indicate a likelihood that the associated products appear in the content item, are referenced by the content item, etc.

In some embodiments, one or more images of a content item are analyzed for potential products included in them. The presence of the potential products may be verified, e.g., by providing images of the content item for further product image detection analysis (e.g., different frames of a video content item, additional frames, etc.), by text or metadata verification, etc. For example, further analysis may be conducted after the candidate products are found that is directed at verification of the candidate products, e.g., a search for other evidence of the identified products may be carried out. In some embodiments, text data and/or metadata associated with a content item may be analyzed for potential/candidate products. The presence of the potential products may be verified, e.g., by image-based verification, text verification, etc.

In some embodiments, processing logic may further be provided with one or more timestamps, e.g., timestamps of frames of a video with detected candidate products, timestamps of captions associated with video or audio content where detected candidate products appear, etc. Processing logic may utilize timestamps for further analysis, to adjust metadata of the content item, to generate UI elements associated with presentation of the content item, etc.

At block 514, processing logic provides the first data and the second data to a trained machine learning model. The trained machine learning model may be a fusion model. The trained machine learning model may be provided with one or more lists of products with associated confidence values.

At block 516, processing logic receives a third confidence value associated with the first product from the trained machine learning model. In some embodiments, processing logic may receive a list of confidence values associated with a list of products, including the first product.

At block 518, processing logic adjusts metadata associated with the content item in view of the third confidence value. In some embodiments, adjusting metadata may include adding one or more connections between the content item and a product to the metadata. For example, adjusting the metadata may include adding an indication that a particular product is associated with, featured in, included in, advertised by, etc., the content item. Adjusting the metadata may include adjusting captions of a content item, for example to include one or more references to products that were incorrectly transcribed during caption generation.

Figure 5C:
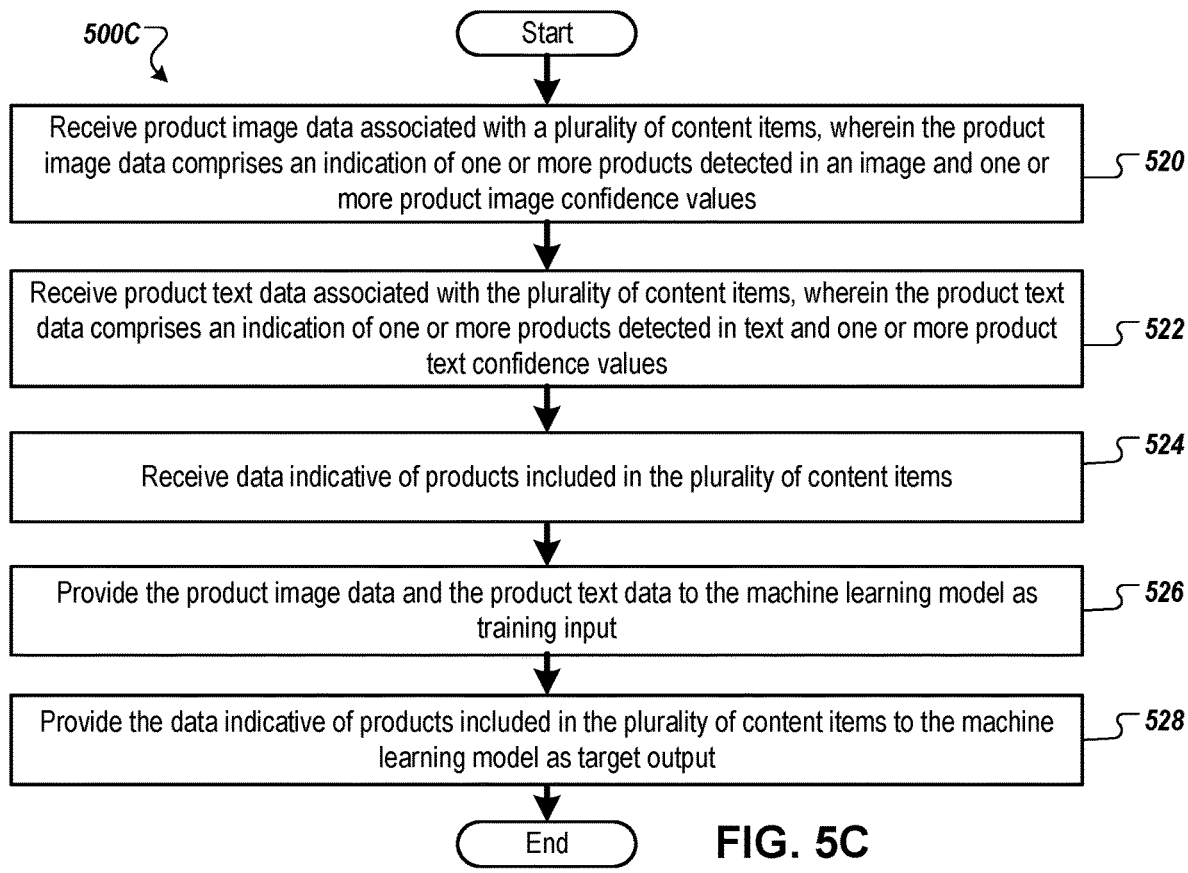
FIG. 5C is a flow diagram of a method for training a machine learning model associated with content item and product pairing, according to some embodiments.

FIG. 5C is a flow diagram of a method 500C for training a machine learning model associated with content item product pairing, according to some embodiments. In some embodiments, the machine learning model trained using method 500C may be a fusion model. A similar method may be utilized to train different models connected to media item product pairing, e.g., image identification models, image verification models, text identification models, caption updating models, etc.

At block 520, processing logic receives product image data associated with a plurality of content items. Product image data may include data associating products to the content items, the associations may be derived from one or more images, e.g., frames of a video. Product image data comprises an indication of one or more products (e.g., potential products, candidate products) detected (e.g., determined) in an image and one or more product image confidence values.

At block 522, processing logic receives product text data associated with the plurality of content items. Product text data may include data associating products to the content items. The associations may be derived from text associated with the content items, e.g., metadata associated with the content items. Product text data comprises an indication of one or more products detected in text (associated with the content items) and one or more product text confidence values.

Data received (or obtained, in some embodiments) by the processing logic at blocks 520 and 522 may be used as training input to train a fusion model. Training machine learning models to perform different functions may include processing logic receiving different data as training input.

At block 524, processing logic receives data indicative of products included in the plurality of content items. For example, each of the plurality of content items used to train the model (e.g., data associated with the content items may be used to train the model) may include a list of associated products, e.g., labeled by one or more users, labeled by a content creator, etc. Data received by processing logic at block 524 may be used as target output for training a fusion model. Training machine learning models to perform different functions may include processing logic receiving different data as target output.

At block 526, processing logic provides the product image data and the product text data to the machine learning model as training input. Processing logic may provide different types of data to train different machine learning models. In some embodiments, a machine learning model for frame selection may be trained by providing frames of a video to the model as training input. In some embodiments, a machine learning model for object detection may be trained by providing images (possibly including products) to a machine learning model as training input. A machine learning model for embedding may be trained by providing one or more images of objects (e.g., products) to a model as training input. In some embodiments, a text parsing model may be trained by providing text associated with a content item (e.g., metadata) as training input. In some embodiments, a model configured to correct captions may be provided with machine-generated captions as training input.

At block 528, processing logic provides data indicative of products included in the plurality of content items (e.g., a list of products included in each content item of the plurality of content items) to the machine learning model as target output. Processing logic may provide different types of data to train different machine learning models. In some embodiments, a machine learning model for frame selection may be trained by providing data indicating which frames of one or more videos include products as target output. In some embodiments, a machine learning model for object detection may be trained by providing labels of objects in images provided to the model as target output. In some embodiments, a text parsing model may be trained by providing content items referenced by text of a content item as target output. In some embodiments, a model configured to correct captions may be provided with corrected captions (e.g., including one or more products) as target output. In some embodiments, target output is not provided to train a machine learning model (e.g., an unsupervised machine learning model).

Figure 5D:
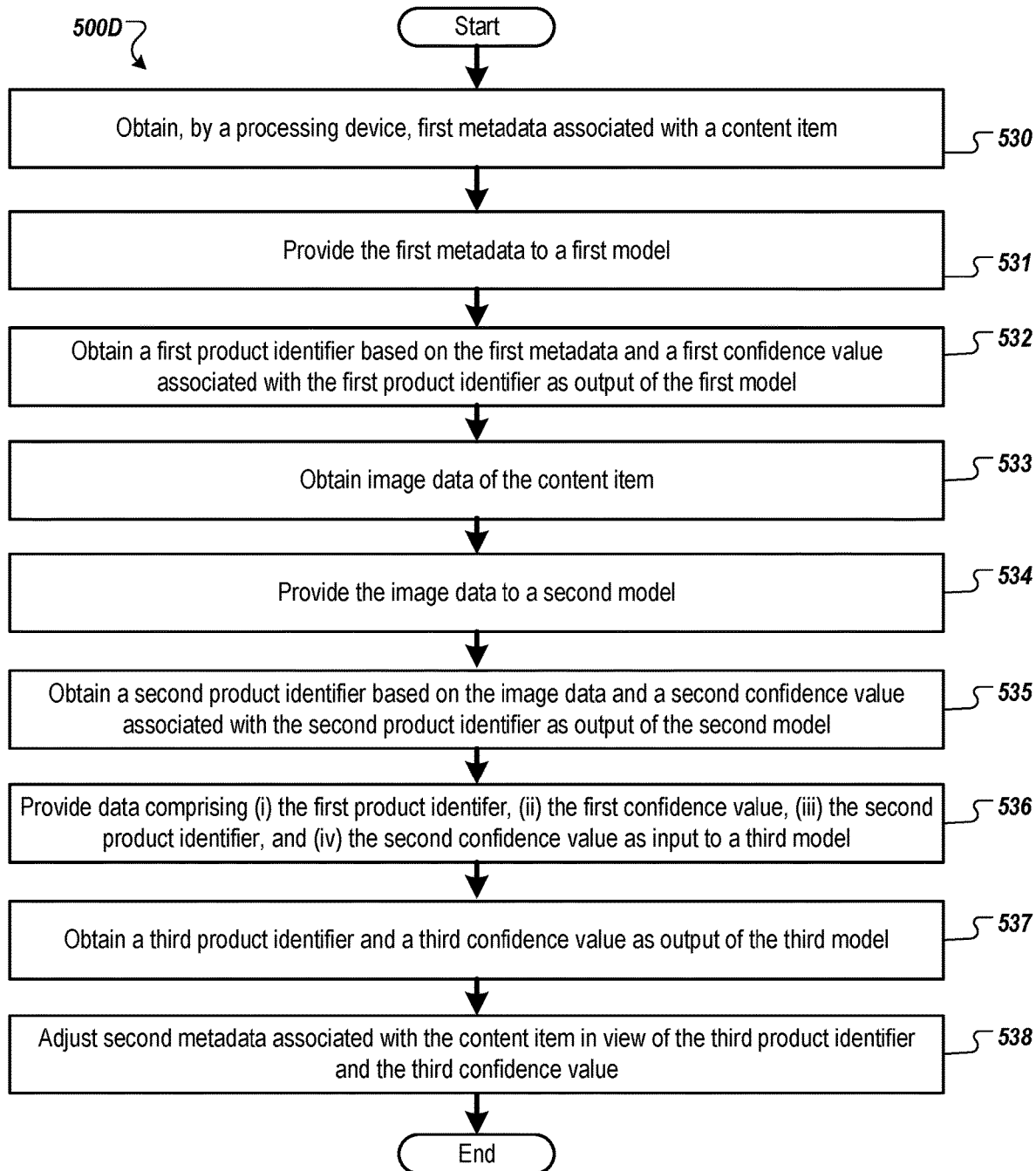
FIG. 5D is a flow diagram of a method for adjusting metadata associated with a content item, according to some embodiments.

FIG. 5D is a flow diagram of a method 500D for adjusting metadata associated with a content item, according to some embodiments. At block 530, processing logic obtains first metadata associated with a content item. Metadata may include text data. Metadata may include a content item title, description, captions, comments, live chat, etc. At block 531, processing logic provides the first metadata to a first model. In some embodiments, the model is a trained machine learning model. In some embodiments, the model is a product detection model, e.g., the model is configured to receive metadata and generate an indication of products associated with the content item (e.g., in view of the metadata).

At block 532, processing logic obtains a first product identifier based on the first metadata and a first confidence value associated with the first product identifier as output of the first model. The product identifier may be an ID number, an indicator, a product name, or any data that (uniquely) distinguishes a product. The first product identifier may identify a first product. In some embodiments, the processing logic may obtain a list of products (e.g., candidate products, potential products) and associated confidence values.

At block 533, processing logic obtains image data of the content item. In some embodiments, image data may include or be extracted from one or more frames of a video. In some embodiments, image data may be obtained from an object detection model. In some embodiments, image data may include one or more products associated with the content item.

At block 534, processing logic provides the image data to a second model. In some embodiments, the second model is a machine learning model. In some embodiments, the second model is a model configured to identify products from images. In some embodiments, the second model is a model configured to verify the presence of identified product from images. In some embodiments, the second model may reduce the dimensionality of the provided image data. In some embodiments, the second model may compare the reduced dimensionality image data to second reduced dimensionality image data (e.g., retrieved from a data store, output by a machine learning model, etc.).

At block 535, processing logic obtains a second product identifier based on the image data and a second confidence value associated with the second product identifier as output of the second model. In some embodiments, the second product identifier indicates a second product. In some embodiments, the second product is the same as the first product. In some embodiments, processing logic may obtain a list of products and associated confidence values.

At block 536, processing logic provides data including the first product identifier, the first confidence value, the second product identifier, and the second confidence value as input to a third model. The third model may be a fusion model.

At block 537, processing logic obtains a third product identifier and a third confidence value as output of the third model. In some embodiments, the third confidence value may indicate a likelihood that a product indicated by the third product identifier is associated with the content item (e.g., present in the content item). In some embodiments, the third model may output a list of products and associated confidence values. In some embodiments, the third product identifier identifies a third product. In some embodiments, the third product is the same as the second product. In some embodiments, the third product is the same as the first product. In some embodiments, the first, second, and third products are all the same product.

At block 538, processing logic adjusts second metadata associated with the content item in view of the third product identifier and the third confidence value. Adjusting metadata may include supplementing metadata with one or more product associations, e.g., indications of associated products. Adjusting metadata may include updating captions, e.g., to include products that may have been incorrectly transcribed (e.g., incorrectly transcribed by a machine-generated captioning model). In some embodiments, processing logic may further receive one or more time stamps associated with the content item and one or more products (e.g., a time of a video at which a product is detected in an image of the video). Updating metadata may include adding to metadata an indication of a time at which a product is found in the content item.

Figure 5E:
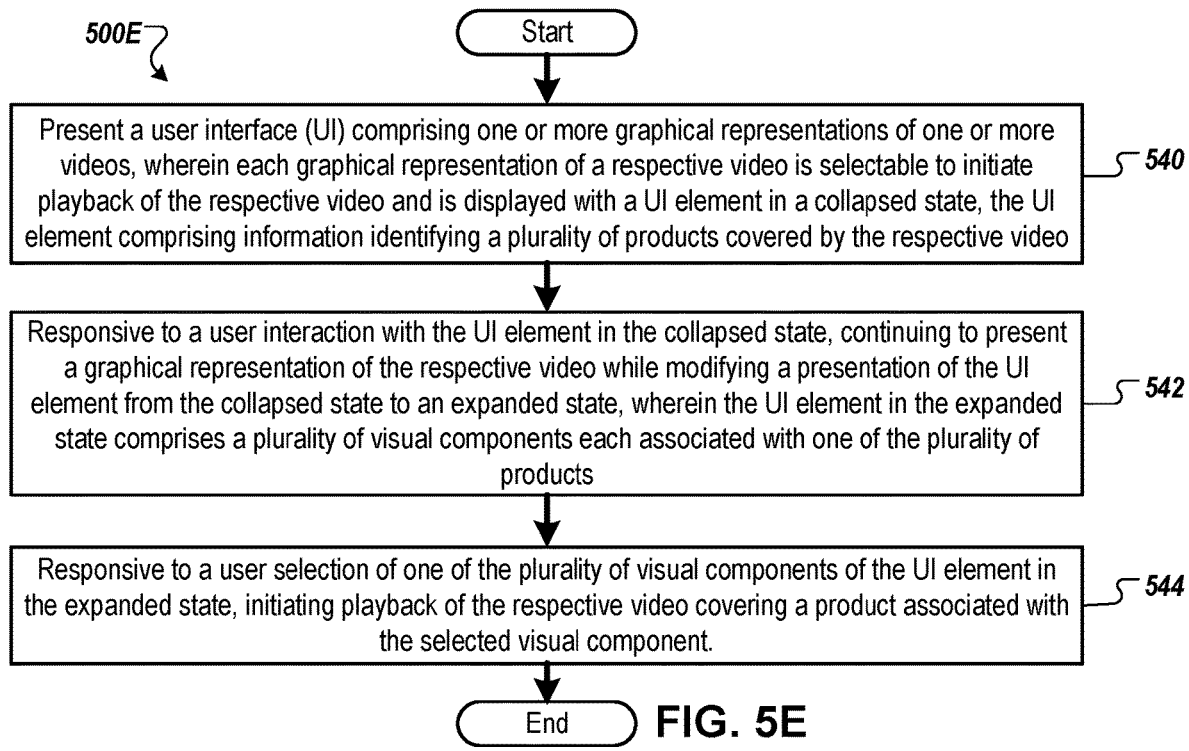
FIG. 5E is a flow diagram of a method for presenting a UI element associated with one or more products, according to some embodiments.

FIG. 5E is a flow diagram of a method 500E for presenting a UI element associated with one or more products, according to some embodiments. At block 540, processing logic (e.g., of a user device, of a client device, etc.) presents a UI. The UI includes one or more graphical representations of one or more content items (e.g., videos). The graphical representations of content items (e.g., video thumbnails) may be selected to initiate presentation of the associated content items. One or more graphical representations of content items may be displayed with a UI element associated with one or more products. Each graphical representation of a respective content item may be displayed with a UI element associated with one or more products. The UI element(s) may be presented/displayed in a collapsed state, e.g., a collapsed default state. The UI element includes information identifying a plurality of products covered by the respective content item. The UI element may identify that one or more products are associated with the content item. The UI element may identify one or more products (e.g., via name, picture, etc.) that are associated with the content item (e.g., covered in a video).

The UI may present selectable graphical representations of content items. The content items represented may be part of a home feed, provided in response to a search, may be part of a watch list, may be part of a playlist, may be part of a shopping feed, etc. In some embodiments, the UI element may be overlaid on top of and/or in front of one or more other elements of the UI. For example, the UI element (e.g., in the collapsed state) may be overlaid on the graphical representation of the content item, may be overlaid on the content item (e.g., while the content item is being presented), etc.

At block 542, responsive to a user interaction with the UI element in the collapsed state, processing logic continues to facilitate presentation of a graphical representation of the respective video while modifying a presentation of the UI element from the collapsed state to an expanded state. Interaction with the UI element may include selecting the UI element. Interaction with the UI element may include dwelling on the UI element (e.g., placing a cursor on the UI element, scrolling to the UI element and pausing scrolling, etc.). The UI element in the expanded state may include a plurality of visual components. Each visual component may be associated with one of the plurality of products. The visual components may include pictures, descriptions, prices, time stamps, etc., associated with various products.

In some embodiments, the UI element (e.g., in the expanded state) may include multiple tabs. For example, the UI element may include a tab for products, a tab for chapters or portions of the content item, etc. The UI element may display/open the tab for products by default for content items with associated products. The UI element may display the tab for products by default responsive to user action and/or history.

At block 544, responsive to a user selection of one of the plurality of visual components of the UI element in the expanded state, processing logic initiates presentation of the respective content item covering a product associated with the selected visual component. Processing logic may initiate playback of a video covering the product associated with the selected visual component. Processing logic may initiate presentation of a portion of a content item (e.g., initiate playback of a portion of a video) associated with the product of the selected visual component.

In some embodiments, interacting with a UI element may cause modification of the UI element to a product focused state. A product focused state may present additional information, detailed information, etc., about one or more products. Interaction with the UI element in the collapsed state may cause modification of the UI element to the product focused state. Interaction with the UI element in the expanded state (e.g., interaction with a visual component of the UI element associated with a product) may cause modification of the UI element to the product focused state.

In some embodiments, interacting with a UI element may cause modification of the presentation of the UI element to a transaction state. Interaction with the UI element in the collapsed state may cause modification of presentation of the UI element to the transaction state. Interaction with the UI element in the expanded state (e.g., selection of a component associated with a product) may cause modification of presentation of the UI element to the transaction state. Interaction with the UI element in the product focused state may cause modification of presentation of the UI element to the transaction state. Determining whether selection or interaction of a UI element, UI element component, or the like causes a transition to the transaction state may be performed based on user history, user preference, content item, content item feed (e.g., search results, watch feed, etc.), or the like.

In some embodiments, a UI element may be overlaid on a presented content item. For example, a UI element identifying one or more products may be displayed overlaid on a video while the video is playing, while the video is showing the one or more products, etc. Selection of the overlaid UI element may cause an additional UI element to be displayed, may cause the overlaid UI element to be modified to a different state, may cause a separate UI element to be modified to a different state, etc. The UI element overlaid may be in a collapsed state, expanded state, product focused state, transaction state, etc. The presence and/or location of an overlaid UI element may be determined by one or more trained machine learning models, e.g., one or more models configured to detect products.

Figure 5F:
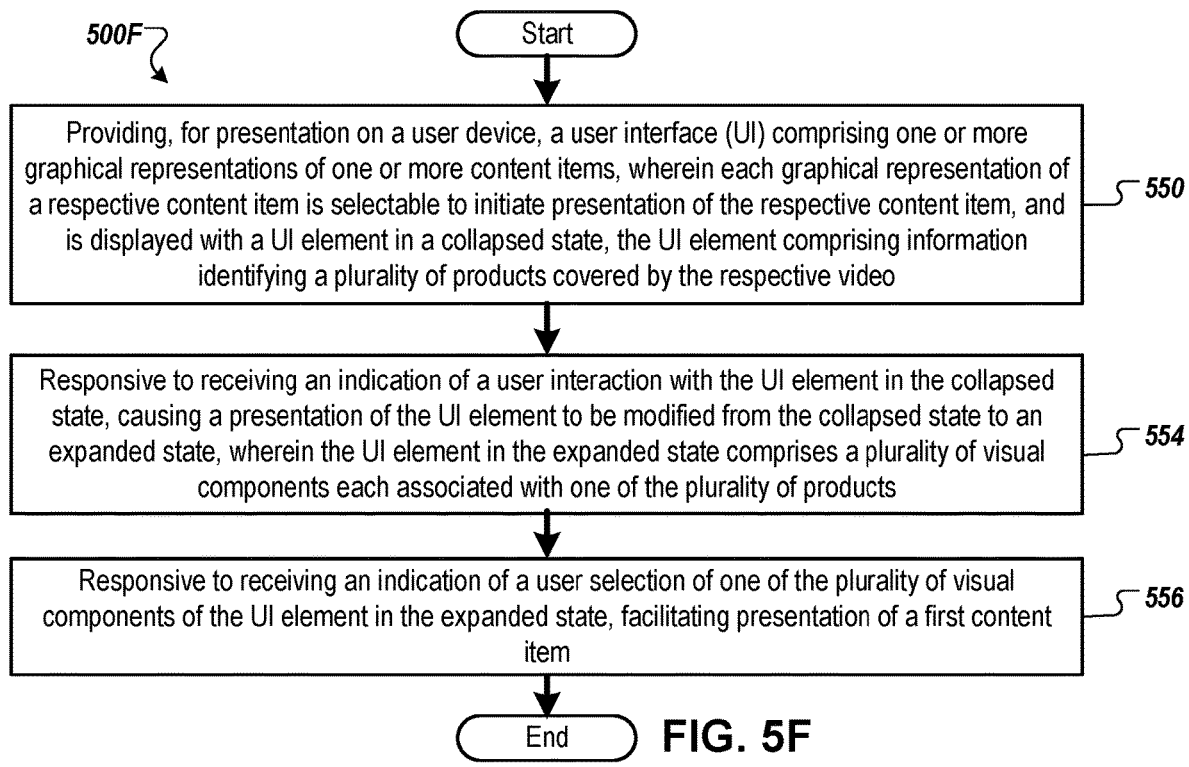
FIG. 5F is a flow diagram of a method for instructing a device to present one or more UI elements associated with products, according to some embodiments.

FIG. 5F is a flow diagram of a method 500F for instructing a device to present one or more UI elements associated with products, according to some embodiments. At block 550, processing logic provides to a device a UI including one or more graphical representations of one or more content items. The graphical representations are provided for display/presentation by a UI of the device. Each graphical representation of a respective content item is selectable to initiate presentation of the respective content item. The content items may include videos. The content items may include live-streamed videos. The graphical representations may be provided responsive to a request by the device. The graphical representations may comprise a home feed, a watch feed, a playlist, a search results list, a shopping feed, etc. Instructions sent to the device (e.g., including instructions associated with any steps of method 500F), a UI sent to the device, UI elements sent to the device, etc., may be determined/selected based on obtaining a history of the user. The history of the user may include historical interactions and/or selections of content items, including content items with associated products. The history of the user may include historical interactions and/or selections of UI elements or components of UI elements associated with products. The history of the user may include one or more searches of the user, e.g., searches including product names. Instructions may be provided to the device responsive to processing logic receiving a history of the user.

One or more of the graphical representations of the content items are displayed with a UI element in a collapsed state. In some embodiments, each graphical representation is displayed with a UI element in a collapsed state. In some embodiments, a subset of graphical representations are displayed with UI elements in a collapsed state. The UI element in the collapsed state is presented/displayed with a first graphical representation of a first content item. The UI element includes information identifying a plurality of products covered by the first content item. The UI element may identify how many products are associated with the content item, may identify one or more products by name, may identify a category or classification of products covered by the content item, etc. In some embodiments, the plurality of products are obtained as output from one or more trained machine learning models. The trained machine learning models may be similar to those described in connection with FIG. 3B.

At block 554, responsive to receiving an indication of a user interaction with the UI element in the collapsed state, processing logic causes the device to modify a presentation of the UI element. The presentation of the UI element may be modified from a collapsed state to an expanded state. The UI element in the expanded state may include a plurality of visual components, each associated with one of the plurality of products. The visual components may include pictures, names, descriptions, prices, time stamps, etc.

At block 556, responsive to receiving an indication of a user selection of one of the plurality of visual components of the UI element in the expanded state, processing logic facilitates presentation of a first content item. Processing logic may provide instructions facilitating presentation of a portion of the first content item associated with a first product, e.g., the product associated with the one of the plurality of visual components. Processing logic may provide instructions to display a portion of a video associated with the product (e.g., to start playing the video from a selected point in the video, based on a time stamp associated with the product).

In some embodiments, processing logic may further provide instructions to the device to modify a presentation of the UI element to a product focused state. For example, upon selection of a visual component of the UI element in the expanded state, the UI element may be modified to a product focused state. The product focused state may include additional details about one or more products covered by, included in, associated with, etc., a content item.

In some embodiments, processing logic may further provide instructions to the device to modify a presentation of the UI element to a transaction state. The transaction state may facilitate a user initiating a transaction associated with the product (e.g., purchasing the product). The transaction state may be presented responsive to a user action, user history, user selection of one or more UI elements, etc. The UI element in the transaction state may include one or more components facilitating a transaction associated with one or more products.

Figure 6:
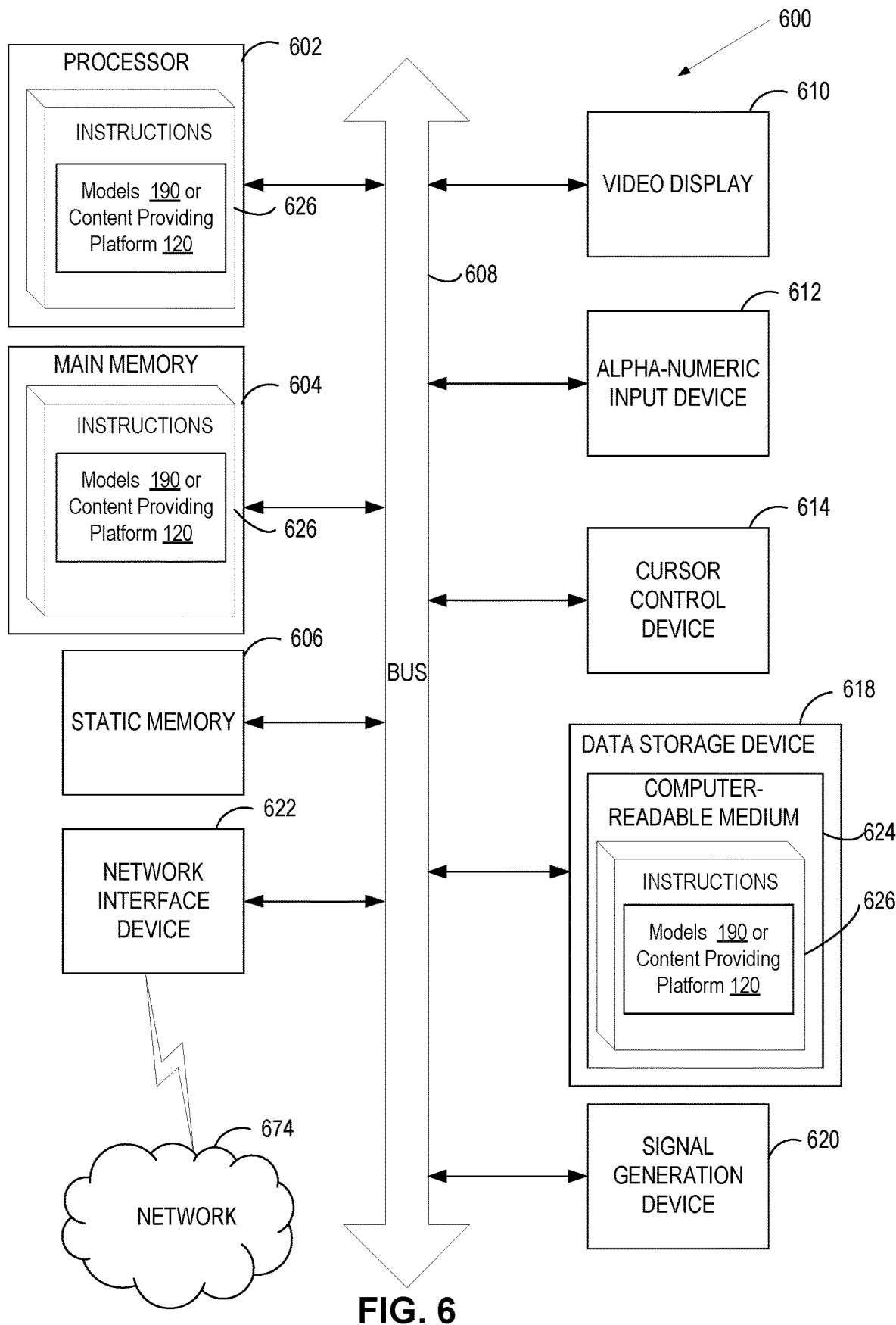
FIG. 6 is a block diagram illustrating an exemplary computer system, in accordance with implementations of the present disclosure.

FIG. 6 is a block diagram illustrating a computer system 600, according to some embodiments. In some embodiments, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 618, which may communicate with each other via a bus 608.

Processing device 602 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 600 may further include a network interface device 622 (e.g., coupled to network 674). Computer system 600 also may include a video display unit 610 (e.g., an LCD), an alphanumeric input device 612 (e.g., a keyboard), a cursor control device 614 (e.g., a mouse), and a signal generation device 620.

In some embodiments, data storage device 618 may include a non-transitory computer-readable storage medium 624 (e.g., non-transitory machine-readable medium) on which may store instructions 626 encoding any one or more of the methods or functions described herein, including instructions encoding components of FIG. 1 (e.g., content providing platform 120, other platforms of content platform system 102, communication application 115, model 190, etc.) and for implementing methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," "reducing," "generating," "correcting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method, comprising:
providing a user interface (UI) concurrently presenting a plurality of graphical representations of a plurality of videos with a plurality of UI elements in a collapsed state, wherein each graphical representation of a respective video of the plurality of videos is selectable to initiate playback of the respective video, and each UI element presented with a respective video comprises information identifying a plurality of products related to the respective video;
responsive to a user interaction with a UI element of the plurality of UI elements in the collapsed state, continuing to present a graphical representation of the respective video while modifying a presentation of the UI element from the collapsed state to an expanded state, wherein the UI element in the expanded state comprises a plurality of visual components each associated with one of the plurality of products; and
responsive to a user selection of one of the plurality of visual components of the UI element in the expanded state, initiating playback of the respective video of the plurality of videos, the respective video covering a product associated with the selected visual component.

2. The method of claim 1, further comprising modifying the presentation of the UI element from the expanded state to a product focused state responsive to the user selection of the one of the plurality of visual components of the UI element in the expanded state, the UI element in the product focused state comprising detailed information about the product associated with the selected visual component.

3. The method of claim 1, further comprising:
providing a search query to a content platform; and
receiving from the content platform the plurality of graphical representations of the plurality of videos.

4. The method of claim 1, further comprising:
providing a user request to present a first video to a content platform; and
receiving from the content platform the plurality of graphical representations of the plurality of videos as recommended videos associated with the first video.

5. The method of claim 1, wherein the UI element in the expanded state further comprises:
a first tab associated with the plurality of products; and
a second tab associated with a plurality of portions of the respective video, wherein contents of the first tab are presented by default.

6. The method of claim 1, further comprising modifying the presentation of the UI element to a transaction state responsive to a user selection of a component of the UI element associated with the one of the plurality of products, wherein the UI element in the transaction state facilitates a transaction associated with the one of the plurality of products.

7. The method of claim 1, wherein the UI element in the collapsed state is overlaid on one or more of the graphical representation of the respective video or the respective video.

8. The method of claim 1, wherein the user interaction with the UI element in the collapsed state comprises dwelling on the UI element in the collapsed state.

9. A non-transitory machine readable storage medium storing instructions which, when executed, cause a processing device to perform operations comprising:
  providing a user interface (UI) concurrently presenting a plurality of graphical representations of a plurality of videos with a plurality of UI elements in a collapsed state, wherein each graphical representation of a respective video of the plurality of videos is selectable to initiate playback of the respective video, and each UI element presented with a respective video comprises information identifying a plurality of products related to the respective video;
  responsive to a user interaction with a UI element of the plurality of UI elements in the collapsed state, continuing to present a graphical representation of the respective video while modifying a presentation of the UI element from the collapsed state to an expanded state, wherein the UI element in the expanded state comprises a plurality of visual components each associated with one of the plurality of products; and
  responsive to a user selection of one of the plurality of visual components of the UI element in the expanded state, initiating playback of the respective video of the plurality of videos, the respective video covering a product associated with the selected visual component.

10. The non-transitory machine readable storage medium of claim 9, wherein the operations further comprise modifying the presentation of the UI element from the expanded state to a product focused state responsive to the user selection of the one of the plurality of visual components of the UI element in the expanded state, the UI element in the product focused state comprising detailed information about the product associated with the selected visual component.

11. The non-transitory machine readable storage medium of claim 9, wherein the operations further comprise modifying the presentation of the UI element to a transaction state responsive to a user selection of a component of the UI element associated with the one of the plurality of products, wherein the UI element in the transaction state facilitates a transaction associated with the one of the plurality of products.

12. The non-transitory machine readable storage medium of claim 9, wherein the UI element in the expanded state further comprises:
  a first tab associated with the plurality of products; and
  a second tab associated with a plurality of portions of the respective video, wherein contents of the first tab are presented by default.

13. The non-transitory machine readable storage medium of claim 9, wherein initiating playback of the respective video comprises presenting a portion of the respective video depicting the product associated with the selected visual component.

14. A system comprising:
  a memory; and
  a processing device, coupled to the memory, to perform operations comprising:
  providing a user interface (UI) concurrently presenting a plurality of graphical representations of a plurality of videos with a plurality of UI elements in a collapsed state, wherein each graphical representation of a respective video of the plurality of videos is selectable to initiate playback of the respective video, and each UI element presented with a respective video comprises information identifying a plurality of products related to the respective video;
  responsive to a user interaction with a UI element of the plurality of UI elements in the collapsed state, continuing to present a graphical representation of the respective video while modifying a presentation of the UI element from the collapsed state to an expanded state, wherein the UI element in the expanded state comprises a plurality of visual components each associated with one of the plurality of products; and
  responsive to a user selection of one of the plurality of visual components of the UI element in the expanded state, initiating playback of the respective video of the plurality of videos, the respective video covering a product associated with the selected visual component.

15. The system of claim 14, the operations further comprising modifying the presentation of the UI element from the expanded state to a product focused state responsive to the user selection of the one of the plurality of visual components of the UI element in the expanded state, the UI element in the product focused state comprising detailed information about the product associated with the selected visual component.

16. The system of claim 14, the operations further comprising:
  providing a search query to a content platform; and
  receiving from the content platform the plurality of graphical representations of the plurality of videos.

17. The system of claim 14, the operations further comprising:
  providing a user request to present a first video to a content platform; and
  receiving from the content platform the plurality of graphical representations of the plurality of videos as recommended videos associated with the first video.

18. The system of claim 14, wherein the UI element in the expanded state further comprises:
  a first tab associated with the plurality of products; and
  a second tab associated with a plurality of portions of the respective video, wherein contents of the first tab are presented by default.

19. The system of claim 14, the operations further comprising modifying the presentation of the UI element to a transaction state responsive to a user selection of a component of the UI element associated with the one of the plurality of products, wherein the UI element in the transaction state facilitates a transaction associated with the one of the plurality of products.

20. The system of claim 14, wherein the UI element in the collapsed state is overlaid on one or more of the graphical representation of the respective video or the respective video.

21. The system of claim 14, wherein the user interaction with the UI element in the collapsed state comprises dwelling on the UI element in the collapsed state.

* * * * *